United States Patent
Han et al.

(10) Patent No.: US 7,136,507 B2
(45) Date of Patent: Nov. 14, 2006

(54) VIDEO SURVEILLANCE SYSTEM WITH RULE-BASED REASONING AND MULTIPLE-HYPOTHESIS SCORING

(75) Inventors: Mei Han, Cupertino, CA (US); Yihong Gong, Cupertino, CA (US); Hai Tao, Santa Cruz, CA (US)

(73) Assignee: Vidient Systems, Inc., Sunnyvale, CA (US)

( * ) Notice: Subject to any disclaimer, the term of this patent is extended or adjusted under 35 U.S.C. 154(b) by 0 days.

(21) Appl. No.: 10/917,985

(22) Filed: Aug. 12, 2004

(65) Prior Publication Data

US 2005/0104962 A1  May 19, 2005

Related U.S. Application Data

(60) Provisional application No. 60/520,610, filed on Nov. 17, 2003.

(51) Int. Cl.
*G06K 9/00* (2006.01)

(52) U.S. Cl. .................. 382/103; 340/541; 348/143; 348/169

(58) Field of Classification Search ............... 382/103; 340/541; 348/143, 169
See application file for complete search history.

(56) References Cited

U.S. PATENT DOCUMENTS

| | | | |
|---|---|---|---|
| 4,839,631 A | 6/1989 | Tsuji ........................... 340/541 |
| 4,962,473 A | 10/1990 | Crain ........................... 340/541 |
| 5,243,418 A * | 9/1993 | Kuno et al. ................. 348/155 |
| 5,323,470 A * | 6/1994 | Kara et al. .................. 382/103 |
| 5,448,290 A | 9/1995 | VanZeeland ................ 348/153 |
| 5,497,314 A | 3/1996 | Novak | |
| 5,612,928 A | 3/1997 | Haley et al. | |
| 5,666,157 A * | 9/1997 | Aviv ............................ 348/152 |
| 5,828,769 A | 10/1998 | Burns | |
| 5,923,365 A * | 7/1999 | Tamir et al. ................. 348/169 |
| 5,969,755 A * | 10/1999 | Courtney ..................... 348/143 |
| 6,028,626 A | 2/2000 | Aviv ............................ 348/152 |
| 6,069,655 A | 5/2000 | Seeley et al. ............... 348/154 |
| 6,069,696 A | 5/2000 | McQueen et al. | |
| 6,097,429 A | 8/2000 | Seeley et al. ............... 348/154 |
| 6,107,918 A | 8/2000 | Klein et al. ................. 340/511 |
| 6,128,396 A | 10/2000 | Hasegawa et al. .......... 382/103 |
| 6,154,131 A | 11/2000 | Jones et al. ................. 340/540 |
| 6,295,367 B1 | 9/2001 | Crabtree et al. ............ 382/103 |
| 6,301,370 B1 | 10/2001 | Steffens et al. | |
| 6,324,532 B1 | 11/2001 | Spence et al. | |
| 6,628,835 B1 * | 9/2003 | Brill et al. ................... 382/226 |
| 6,654,047 B1 | 11/2003 | Iizaka ......................... 348/143 |
| 6,665,004 B1 | 12/2003 | Paff ............................ 348/156 |

(Continued)

OTHER PUBLICATIONS

D.J. Beymer and K. Konolige. Real-time tracking of multiple people using stereo. Frame-Rate99, 1999.

(Continued)

*Primary Examiner*—Andrew W. Johns
*Assistant Examiner*—Patrick Edwards
(74) *Attorney, Agent, or Firm*—Ronald D. Slusky

(57) ABSTRACT

A video surveillance system uses rule-based reasoning and multiple-hypothesis scoring to detect predefined behaviors based on movement through zone patterns. Trajectory hypothesis spawning allows for trajectory splitting and/or merging and includes local pruning to managed hypothesis growth. Hypotheses are scored based on a number of criteria, illustratively including at least one non-spatial parameter. Connection probabilities computed during the hypothesis spawning process are based on a number of criteria, illustratively including object size. Object detection and probability scoring is illustratively based on object class.

7 Claims, 12 Drawing Sheets

U.S. PATENT DOCUMENTS

| | | | |
|---|---|---|---|
| 6,696,945 B1 | 2/2004 | Venetianer et al. | 340/541 |
| 6,697,103 B1 | 2/2004 | Fernandez et al. | 348/143 |
| 6,707,486 B1 | 3/2004 | Millet et al. | 348/155 |
| 6,757,008 B1 | 6/2004 | Smith | 348/143 |
| 6,876,999 B1 | 4/2005 | Hill et al. | 707/3 |
| 2002/0005955 A1 | 1/2002 | Kramer et al. | |
| 2002/0099770 A1 | 7/2002 | Lindo | |
| 2002/0198854 A1 | 12/2002 | Berenji et al. | |

OTHER PUBLICATIONS

D. Comaniciu, V. Ramesh, and P. Meer. Real-time tracking of non-rigid objects using mean shift, IEEE Computer Society Conference on Computer Vision and Pattern Recognition (CVPR00), pp. II: 142-149, 2000.

S.L. Dockstader and A.M. Tekalp. On the tracking of articulated and occluded video object motion, Real Time Imaging, 7(5):415-432, Oct. 2001.

A.M. Elgammal and L.S. Davis. Probabilistic framework for segmenting people under occlusion, International Conference on Computer Vision (ICCV01), pp. II: 145-152, 2001.

I. Haritaoglu, D. Harwood, and L.S. Davis. Hydra: Multiple people detection and tracking using silhouettes, Worshop on Visual Surveillance (VS99), 1999.

Y. Kirubarajan, Y. Bar-Shalom, and K. R. Pattipati. Multiassignment for track- ing a large number of overlapping objects, IEEE Transactions on Aerospace and Electronic Systems, 37(1):2-21, Jan. 2001.

D.B. Reid. An algorithm for tracking multiple targets, IEEE Transactions on Automatic Control, 24(6):843-854, Dec. 1979.

C. Stauffer and W.E.L. Grimson. Learning patterns of activity using real-time tracking, IEEE Transactions on Pattern Analysis and Machine Intelligence (PAMI), 22(8):747-757, Aug. 2000.

H. Tao, H. S. Sawhney, and R. Kumar. A sampling algorithm for tracking multiple objects, Vision Algorithms 99, 1999.

C.R. Wren, A. Azarbayejani, T.J. Darrell, and A.P. Pentland. PFinder: Real-time tracking of the human body, IEEE Transactions on Pattern Analysis and Machine Intelligence (PAMI), 19(7):780-785, Jul. 1997.

Y. Wu and T.S. Huang. A co-inference approach to robust visual tracking, International Conference on Computer Vision (ICCV01), pp. II: 26-33, 2001.

T. Zhao and R. Nevatia. Stochastic human segmentation from a static camera, Motion02, pp. 9-14, 2002.

T. Zhao, R. Nevatia, and F. LV. Segmentation and tracking of multiple humans in complex situations, IEEE Computer Society Conference on Computer Vision and Pattern Recognition (CVPR01), pp. II:194-201, 2001.

* cited by examiner

TO 517

FROM EXTENSIONS OF THE $j$th HYPOTHESIS
HAVING ALL POSSIBLE COMBINATIONS OF

OBJECT/TRAJECTORY PAIRS
    UNEXTENDED TRAJECTORIES
    UNCONNECTED OBJECTS
    MISSING OBJECTS

THAT SURVIVE LOCAL PRUNING

FROM 516

VIDEO SURVEILLANCE SYSTEM WITH RULE-BASED REASONING AND MULTIPLE-HYPOTHESIS SCORING

CROSS-REFERENCE TO RELATED APPLICATION

This application claims the benefit of U.S. provisional patent application No. 60/520,610 filed Nov. 17, 2003, incorporated herein by reference.

BACKGROUND OF THE INVENTION

Multiple object tracking has been one of the most challenging research topics in computer vision. Indeed, accurate multiple object tracking is the key element of video surveillance system where object counting and identification are the basis of determining when security violations within the area under surveillance are occurring.

Among the challenges in achieving accurate tracking in such systems are a number of phenomena. These phenomena include a) false detections, meaning that the system erroneously reports the presence of an object, e.g., a human being, at a particular location within the area under surveillance a particular time; b) missing data, meaning that the system has failed to detect the presence of an object in the area under surveillance that actually is there; c) occlusions, meaning that an object being tracked has "disappeared" behind another object being tracked or some fixed feature (e.g., column or partition) within the area under surveillance; d) irregular object motions, meaning, for example, that an object that was moving on a smooth trajectory has abruptly stopped or changed direction; e) changing appearances of the objects being tracked due, for example, to changed lighting conditions and/or the object presenting a different profile to the tracking camera.

Among the problems of determining when security violations have occurred or are occurring is the unavailability of electronic signals that could be profitably used in conjunction with the tracking algorithms. Such signals include, for example, signals generated when a door is opened or when an access device, such as a card reader, has been operated. Certainly an integrated system built "from the ground up" could easily be designed to incorporate such signaling, but it may not be practical or economically justifiable to provide such signals to the tracking system when the latter is added to a facility after the fact.

SUMMARY OF THE INVENTION

The present invention addresses one or more of the above problems, as well as possibly addressing other problems as well. The invention is particularly useful when implemented in a system that incorporates the inventions that are the subject of the co-pending United States patent applications listed at the end of this specification.

A video surveillance system embodying the principles of the invention generates a plurality of hypotheses, each of which comprises a respective different set of hypothesized trajectories of objects hypothesized to have been moving through an area under surveillance at a particular time. At least a particular one of the hypotheses is identified as being more likely than others of the hypotheses to represent the actual trajectories of the actual objects moving through the area under surveillance at that particular time. That particular one of the hypotheses is used to determine whether at least one predefined alert condition has occurred within the area under surveillance.

In particular embodiments of the invention, a likelihood is computed for each of the hypotheses and the hypothesis having the largest computed likelihood is the one used to determined whether an alert condition has occurred. The computed likelihood is a function of connection probabilities each associated with a respective trajectory of the hypothesis in question. Each connection probability is a measure of the probability that an object that terminates the associated trajectory is, in fact, an object in the area under surveillance that is on that trajectory.

In particular embodiments of the invention, the objects that are tracked are people and the at least one alert condition includes a predetermined pattern of movement of one or more people relative to at least one of a) at least one other person, b) one or more fixed objects, or c) one or more predefined zones within the area under surveillance. The predetermined pattern of movement may include at least one time criterion.

In particular embodiments of the invention, the hypotheses for a particular point in time are generated by extending hypotheses generated for a previous point in time.

DRAWING

Figure 1A:
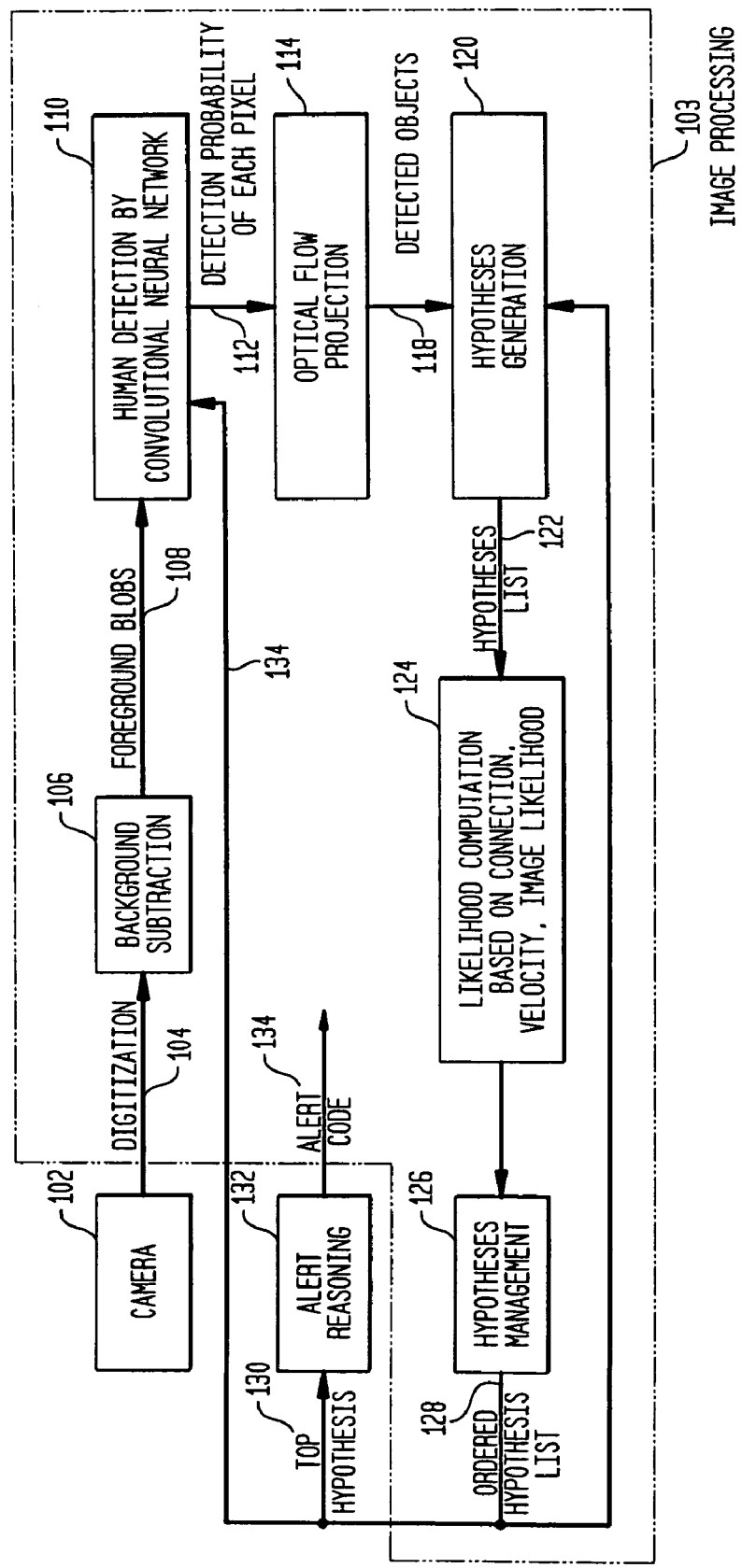
FIG. 1A is a block diagram of image-based multiple-object tracking system embodying the principles of the invention.
Figure 5:
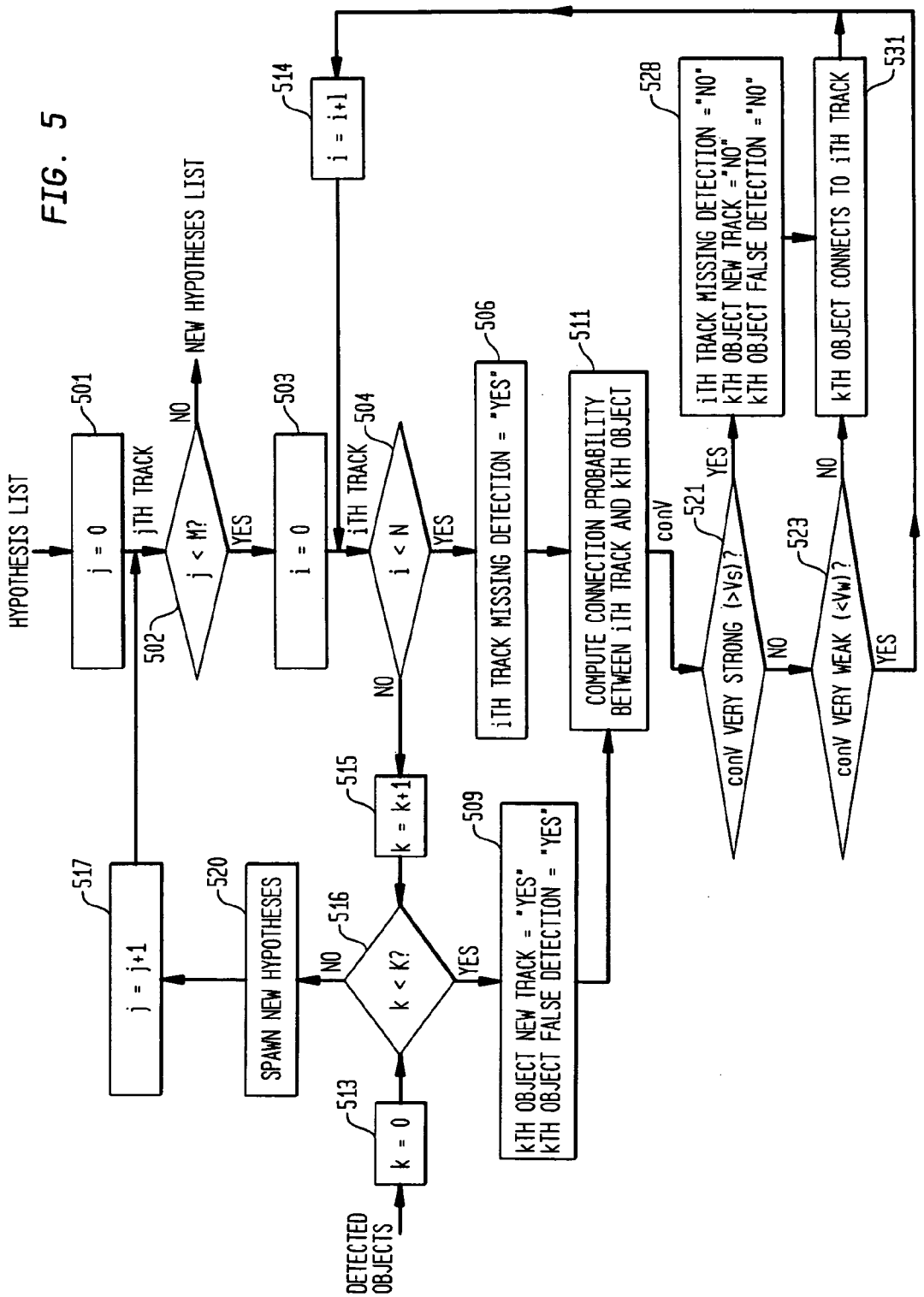
FIG. 5, shows a process carried out by the hypothesis generation portion of the system of FIG. 1A in order to implement so-called local pruning.
Figure 6:
Figure 6:
Figure 7:
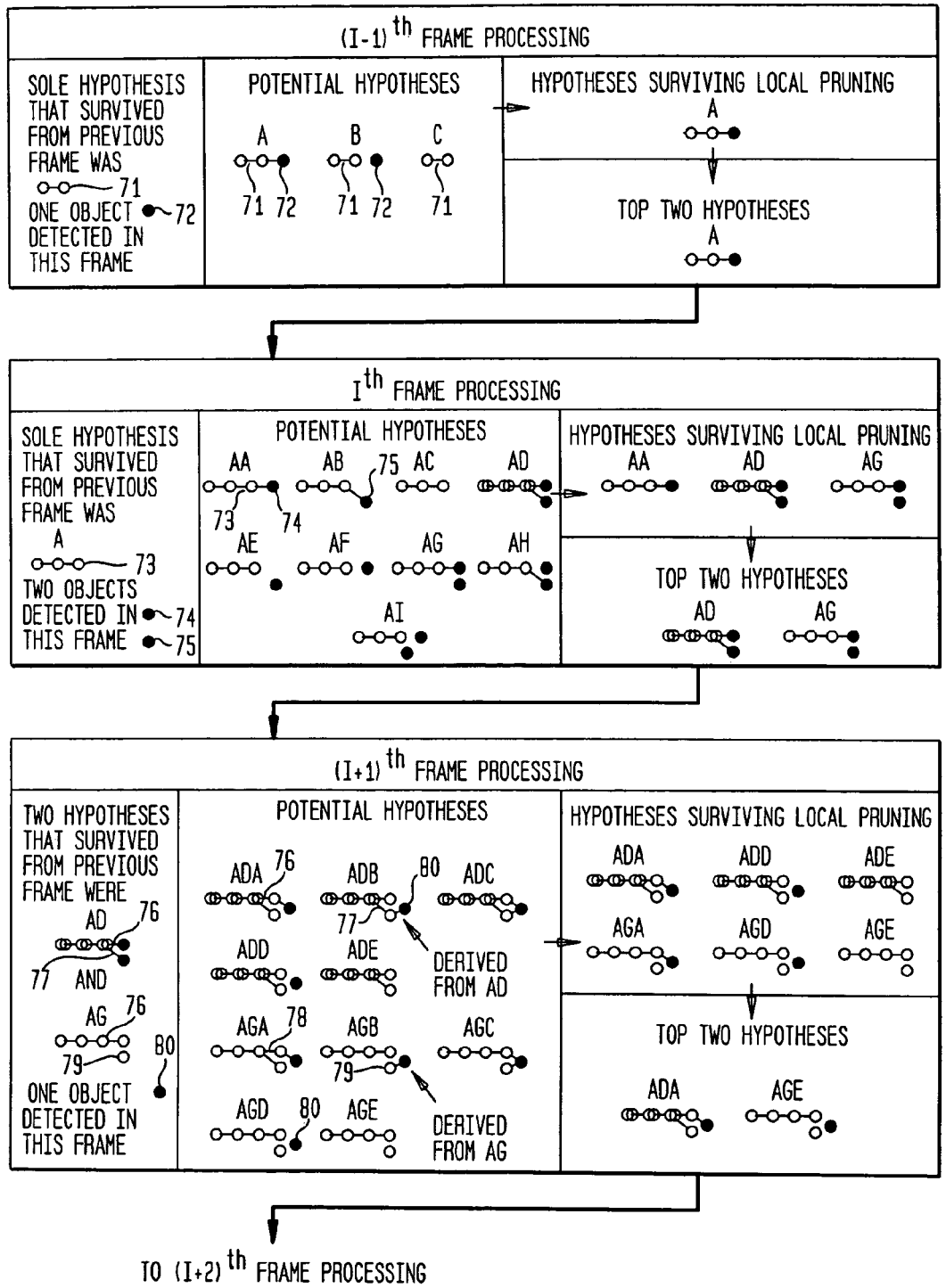
Figure 8:
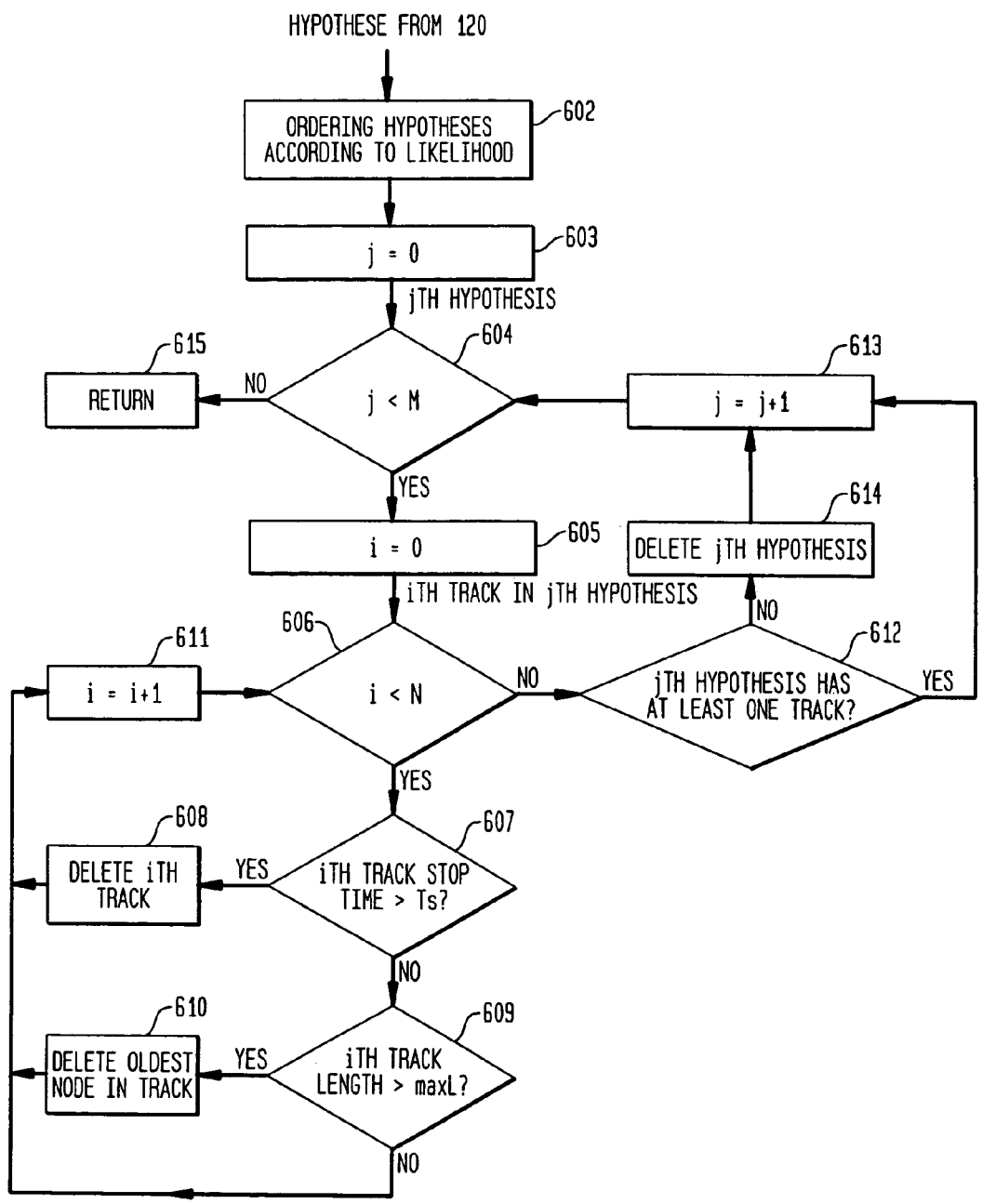

FIG. 6 indicates how data developed during the processing carried out in FIG. 5 is used to spawn new hypotheses;

FIG. 7 shows a simplified example of how hypotheses are generated;

FIG. 8 shows the processing carried out within the hypothesis management portion of the system of FIG. 1A; and FIGS. 9A through 9E graphically depict the process by which the system of FIG. 1A detects the presence of humans in the area under surveillance.

DETAILED DESCRIPTION

The image-based multiple-object tracking system in FIG. 1A is capable of tracking various kinds of objects as they move, or are moved, through an area under surveillance. Such objects may include, for example, people, animals, vehicles or baggage. In the present embodiment, the system is arranged to track the movement of people. Thus in the description that follows terms including "object," "person,"

"individual," "human" and "human object" are used interchangeably except in instances where the context would clearly indicate otherwise.

The system comprises three basic elements: video camera 1502, image processing 103 and alert reasoning 132.

Figure 2A:
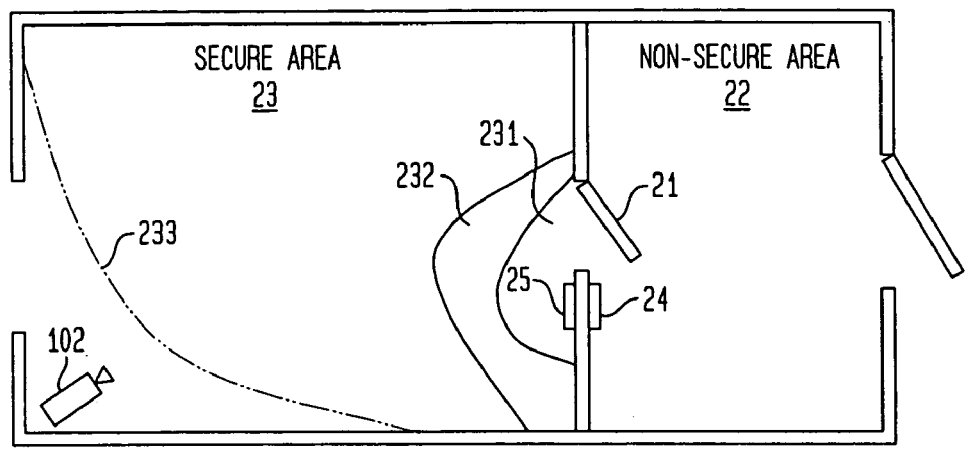
FIGS. 2A through 2F depict various patterns of movement that are indicative of alarm conditions of a type that the system of FIG. 1A is able to detect.

Video camera 102 is preferably a fixed or static camera that monitors and provides images as sequences of video frames. The area under surveillance is illustratively secure area 23 shown in FIG. 2A. A secured access door 21 provides access to authorized individuals from a non-secure area 22 into secure area 23. Individuals within area 22 are able to obtain access into area 23 by swiping an access card at an exterior access card reader 24 located near door 21 in non-secure area 22, thereby unlocking and/or opening door 21. In addition, an individual already within area 22 seeking to leave that area through door 21 does so by swiping his/her access card at an interior access card reader 25 located near door 21 in secure area 23.

Image processing 103 is software that processes the output of camera 102 and generates a so-called "top hypothesis" 130. This is a data structure that indicates the results of the system's analysis of some number of video frames over a previous period of time up to a present moment. The data in top hypothesis 130 represents the system's assessment as to a) the locations of objects most likely to actually presently be in the area under surveillance, and b) the most likely trajectories, or tracks, that the detected objects followed over the aforementioned period of time.

Figure 3A:
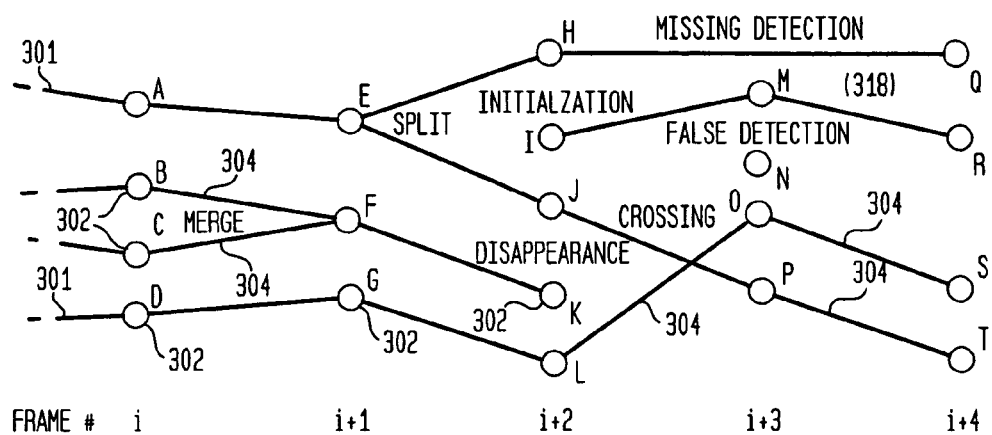
FIGS. 3A and 3B depict two possible so-called hypotheses, each representing a particular unique interpretation of object detection data generated by the system of FIG. 1A over a period of time.

An example of one such hypothesis is shown in FIG. 3A. In this FIG., the nodes (small circles) represent object detections and the lines connecting the nodes represent the movement of objects between frames. This hypothesis is associated with the most recent video frame, identified by the frame number i+4. As seen in the rightmost portion of the FIG., four objects labeled Q, R, S and T were detected in frame i+4 and it has been determined—by having tracked those objects through previous frames, including frames i, i+1, i+2 and i+3—that those objects followed the particular trajectories shown. The frame index i illustratively advances at a rate of 10 frames/second, which provides a good balance between computational efficiency and tracking accuracy. FIG. 3A is described in further detail below.

Referring again to FIG. 1A, top hypothesis 130 is applied to alert reasoning 132. This is software that analyzes top hypothesis 130 with a view toward automatically identifying certain abnormal behaviors, or "alert conditions," that the system is responsible to identify based on predefined rules. It is, of course, possible to set up sensors to detect the opening and closing of a door. However, the image-based system disclosed herein provides a way of confirming if objects, e.g., people, have actually come through the door and, if so, how many and over what period of time.

The system utilizes a number of inventions to a) analyze the video data, b) determine the top hypothesis at any point in time and b) carry out the alert reasoning.

Alert Reasoning

The alert conditions are detected by observing the movement of objects, illustratively people, through predefined areas of the space under surveillance and identifying an alert condition as having occurred when area-related patterns are detected. A area-related pattern means a particular pattern of movement through particular areas, possibly in conjunction with certain other events, such as card swiping and door openings/closings. Thus certain of the alert conditions are identified as having occurred when, in addition to particular movements through the particular areas having occurred, one or more particular events also occur. If door opening/closing or card swiping information is not available, alert reasoning 132 is nonetheless able to identify at least certain alert conditions based on image analysis alone, i.e., by analyzing the top hypothesis.

As noted above, the objects tracked by this system are illustratively human beings and typical alert conditions are those human behaviors known as tailgating and piggy-backing. Tailgating occurs when one person swipes an access control card or uses a key or other access device that unlocks and/or opens a door and then two or more people enter the secure area before the door is returned to the closed and locked position. Thus, in the example of FIG. 2A, tailgating occurs if more than one person enters secure area 23 with only one card swipe having been made. This implies that after the card was swiped and door 21 was opened, two people passed through the door before it closed. Piggy-backing occurs when a person inside the secure area uses an access control card to open the door and let another person in. Thus in the example of FIG. 2A, piggy-backing occurs if a person inside secure area 23 swipes his/her card at reader 25 but instead of passing through door 21 into non-secure area 22 allows a different person, who is then in non-secure area 22, to pass through into secure area 23. An illustrative list of behaviors that the system can detect, in addition to the two just described, appears below.

Alert reasoning module 132 generates an alert code 134 if any of the predefined alert conditions appear to have occurred. In particular, based on the information in the top hypothesis, alert reasoning module 132 is able to analyze the behaviors of the objects—which are characterized by object counts, interactions, motion and timing—and thereby detect abnormal behaviors, particularly at sensitive zones, such as near the door zone or near the card reader(s). An alert code, which can, for example, include an audible alert generated by the computer on which the system software runs, can then be acted upon by an operator by, for example, reviewing a video recording of the area under surveillance to confirm whether tailgating, piggy-backing or some other alert condition actually did occur.

Moreover, since objects can be tracked on a continuous basis, alert reasoning module 132 can also provide traffic reports, including how many objects pass through the door in either direction or loiter at sensitive zones.

The analysis of the top hypothesis for purposes of identifying alert conditions may be more fully understood with reference to FIGS. 2A through 2F, which show the area under surveillance—secure area 23—divided into zones. There are illustratively three zones. Zone 231 is a door zone in the vicinity of door 21. Zone 232 is a swipe zone surrounding zone 231 and includes interior card reader 25. Door zone 231 and swipe zone 232 may overlap to some extent. Zone 233 is an appearing zone in which the images of people being tracked first appear and from which they disappear. The outer boundary of zone 233 is the outer boundary of the video image captured by camera 102.

Dividing the area under surveillance into zones enables the system to identify alert conditions. As noted above, an alert condition is characterized by the occurrence of a combination of particular events. One type of event is appearance of a person in a given zone, such as the sudden appearance of a person in the door zone 231. Another type of event is the movement of a person in a given direction, such as the movement of the person who appeared in door zone 231 through swipe zone 232 to the appearing zone 233. This set of facts implies that someone has come into secure area 23 through door 21. Another type of event is an interaction, such as if the trajectories of two objects come from the door together and then split later. Another type of event is a behavior, such as when an object being tracked enters the swipe zone. Yet another type of event relates to the manipulation of the environment, such as someone swiping a card though one of card readers 24 and 25. The timing of events is also relevant to alert conditions, such as how long an object stays at the swipe zone and the time difference between two objects going through the door.

Figure 2B:
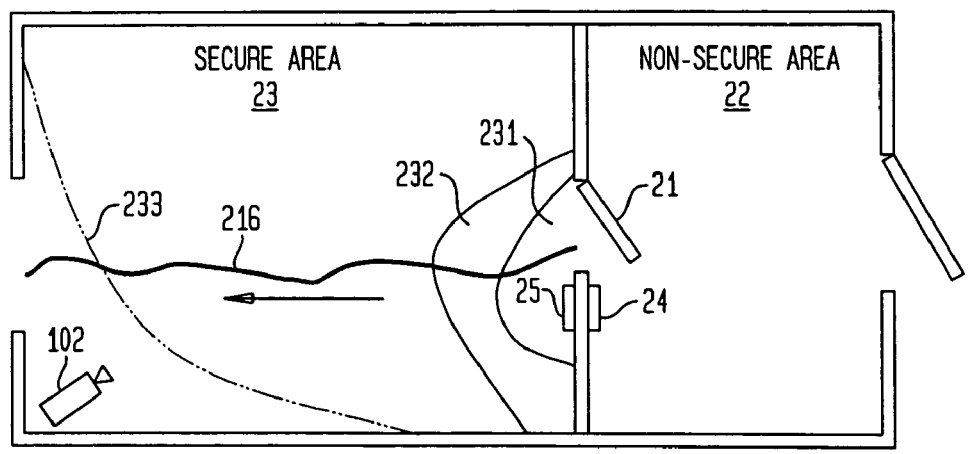
Figure 2C:
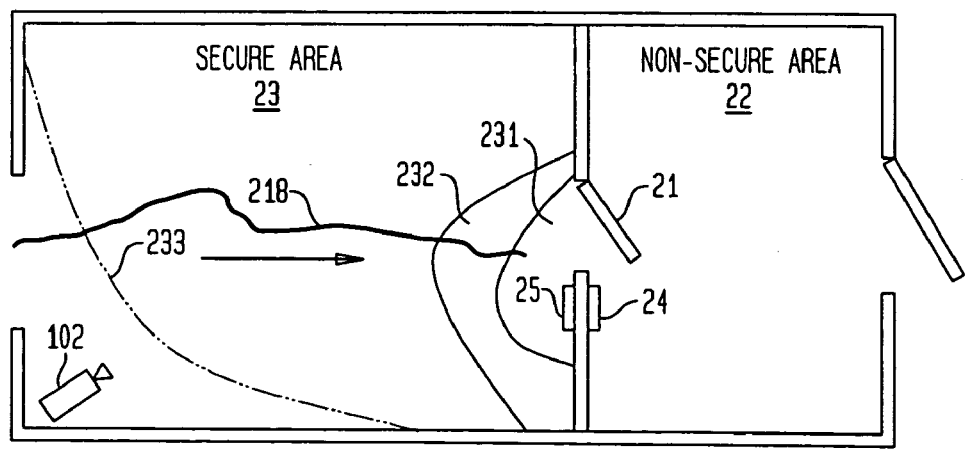

Certain movement patterns represent normal, non-security-violative activities. For example, FIG. 2B shows a normal entrance trajectory 216 in which a person suddenly appears in door zone 231 and passes through swipe zone 232 and appearance zone 233 without any other trajectory being detected. As long as the inception of this trajectory occurred within a short time interval after a card swipe at card reader 24, the system interprets this movement pattern as a normal entrance by an authorized person. A similar movement pattern in the opposite direction is shown in FIG. 2C, this representing a normal exit trajectory 218.

Figure 2D:
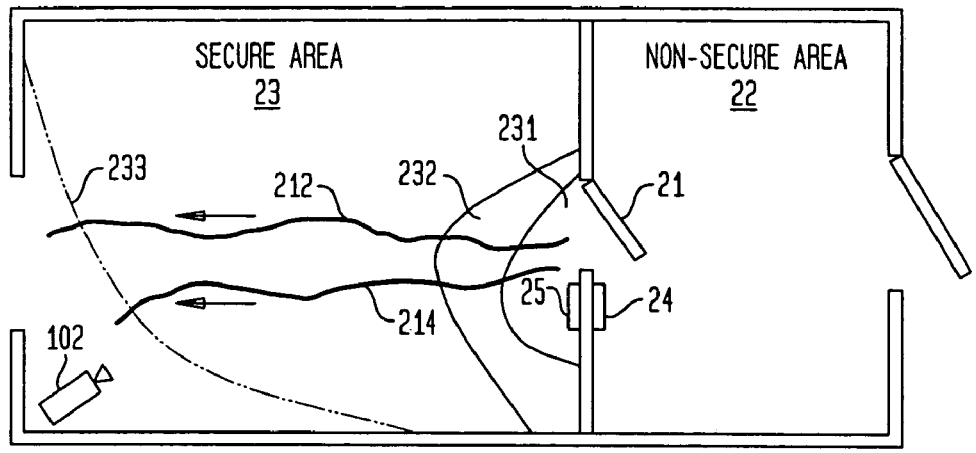
Figure 2E:
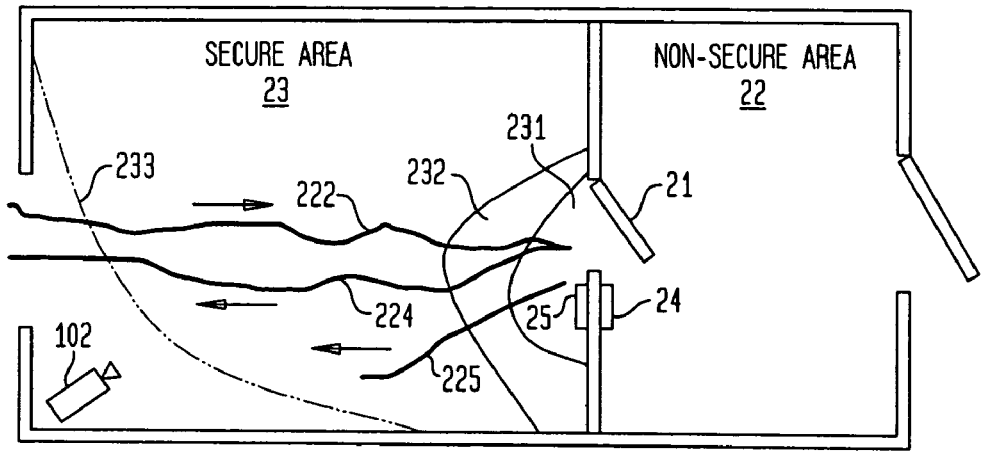
Figure 2F:
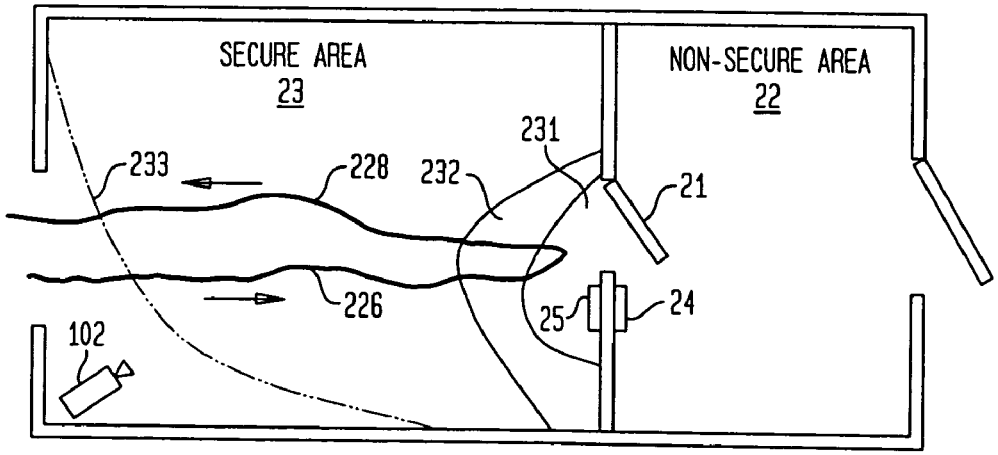

FIGS. 2D–2F illustrate patterns of multiple trajectories through particular zones that are regarded as alert conditions. FIG. 2D, in particular, illustrates a tailgating scenario. In this scenario, two trajectories 212 and 214 are observed to diverge from door zone 231 and/or from swipe zone 232. This pattern implies that two individuals came through the door at substantially the same time. This pattern, taken in conjunction with the fact that only a single card had been swiped through exterior card reader 24, would give rise to a strong inference that tailgating had occurred.

FIG. 2E depicts a piggy-backing scenario. Here, a person approaches swipe zone 232 and possibly door zone 231 along trajectory 222. The same individual departs from zones 231/232 along a return trajectory 224 at the same time that another individual appears in door zone 231 and moves away in a different direction along trajectory 225. This area-related pattern, taken in conjunction with the fact that only a single card swiping had occurred—at interior card reader 25—would give rise to a strong inference that the first person had approached door 21 from inside secure area 23 and caused it to become unlocked it in order to allow a second person to enter, i.e., piggy-backing had occurred.

FIG. 2E depicts a loitering scenario. Here, a person approaches swipe zone 232 and possibly door zone 231 along trajectory 226. The same individual departs from zones 231/232 along a return trajectory 228. Approaching so close to door 21 without swiping one's card and going through the door is a suspicious behavior, especially if repeated, and especially if the person remains within door zone 231 or swipe zone 232 for periods of time that tend to be associated with suspicious behavior. This type of activity suggests that the individual being tracked is, for example, waiting for a friend, for example, to show up in non-secure area 22 so that he/she can be let in using the first person's card. This behavior may be a precursor to a piggy-backing event that is about to occur once the friend arrives at door 21.

Figure 1B:
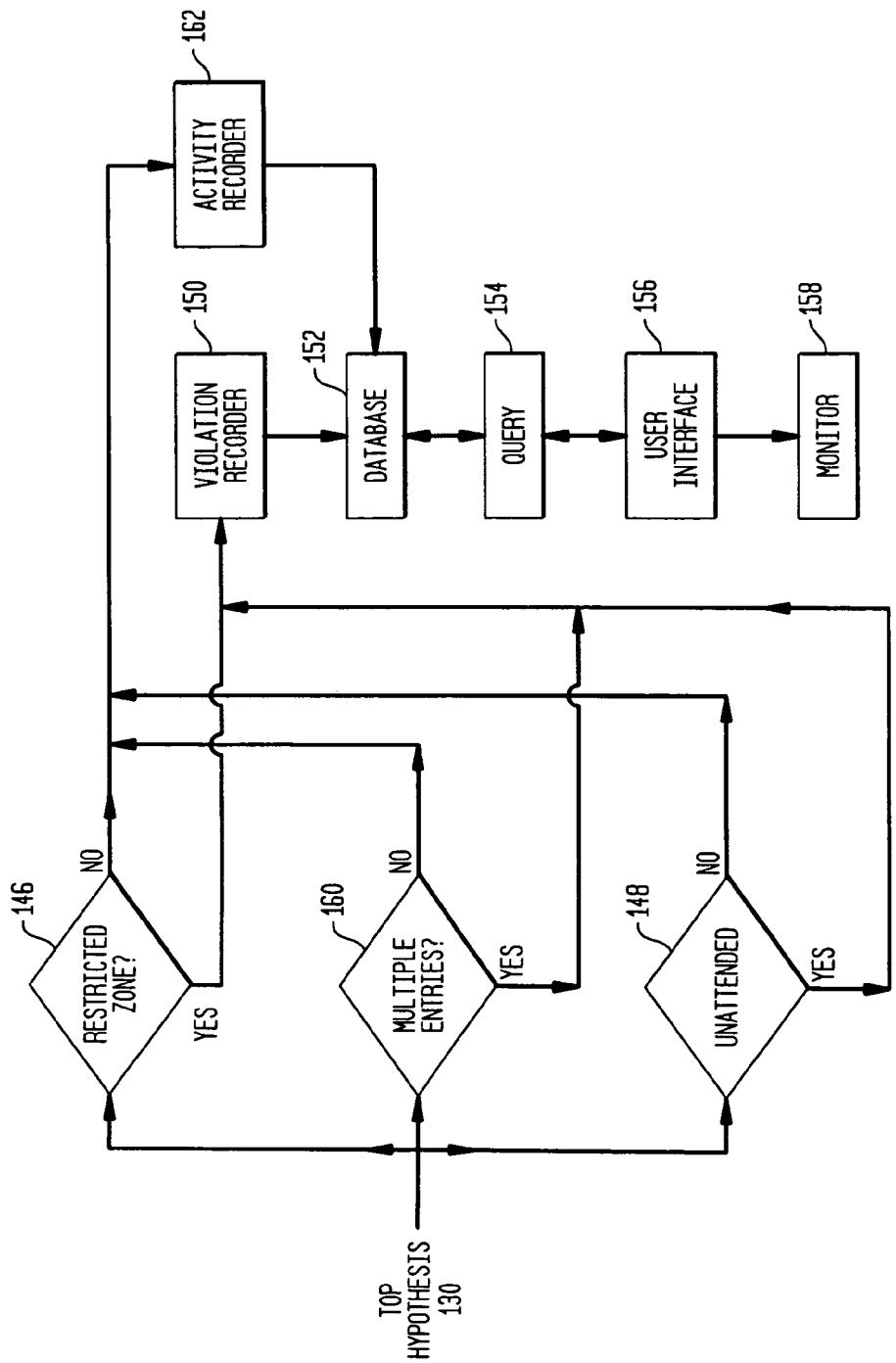
FIG. 1B illustrates the operation of an alert reasoning portion of the system of FIG. 1A.

FIG. 1B illustrates the operation of alert reasoning 132 responsive to top hypothesis 130. By analyzing top hypothesis 130, a restricted zone determination module 146 of alert reasoning 132 can determine whether a particular zone, or sub-zone within some larger overall space, has been entered, such as door area 131 or swipe area 132. At the same time, a determination is made at a multiple entries determination module 160 whether there were multiple entries during an event, e.g., when tailgating is the event sought to be discovered. Since the system has the complete information of the objects' number and motion history, it can record activities or traffic information 162 in a database 152 when multiple entries are not detected and no violation is recorded. The system can also include an unattended object module 148, which can determine from top hypothesis 130 whether a non-human object appeared within the area under surveillance and was left there. This could be detected by observing a change in the background information. Such an event may also be recorded in an activity recorder 162 as following the alert rules and occurring with high likelihood, but as not being a violation to be recorded at the violation recorder 150 in the database 152. Again, a user such as a review specialist may query 154 the database 152 and access recorder events through a user interface 156 for viewing at a monitor 158. The violations recorded in the violation recorder 150 would likely have higher priority to security personnel if tailgating, for example, is the main problem sought to be discovered, whereas activities merely recorded in the activity recorder 162 may be reviewed for traffic analysis and other data collection purposes.

Figure 1C:
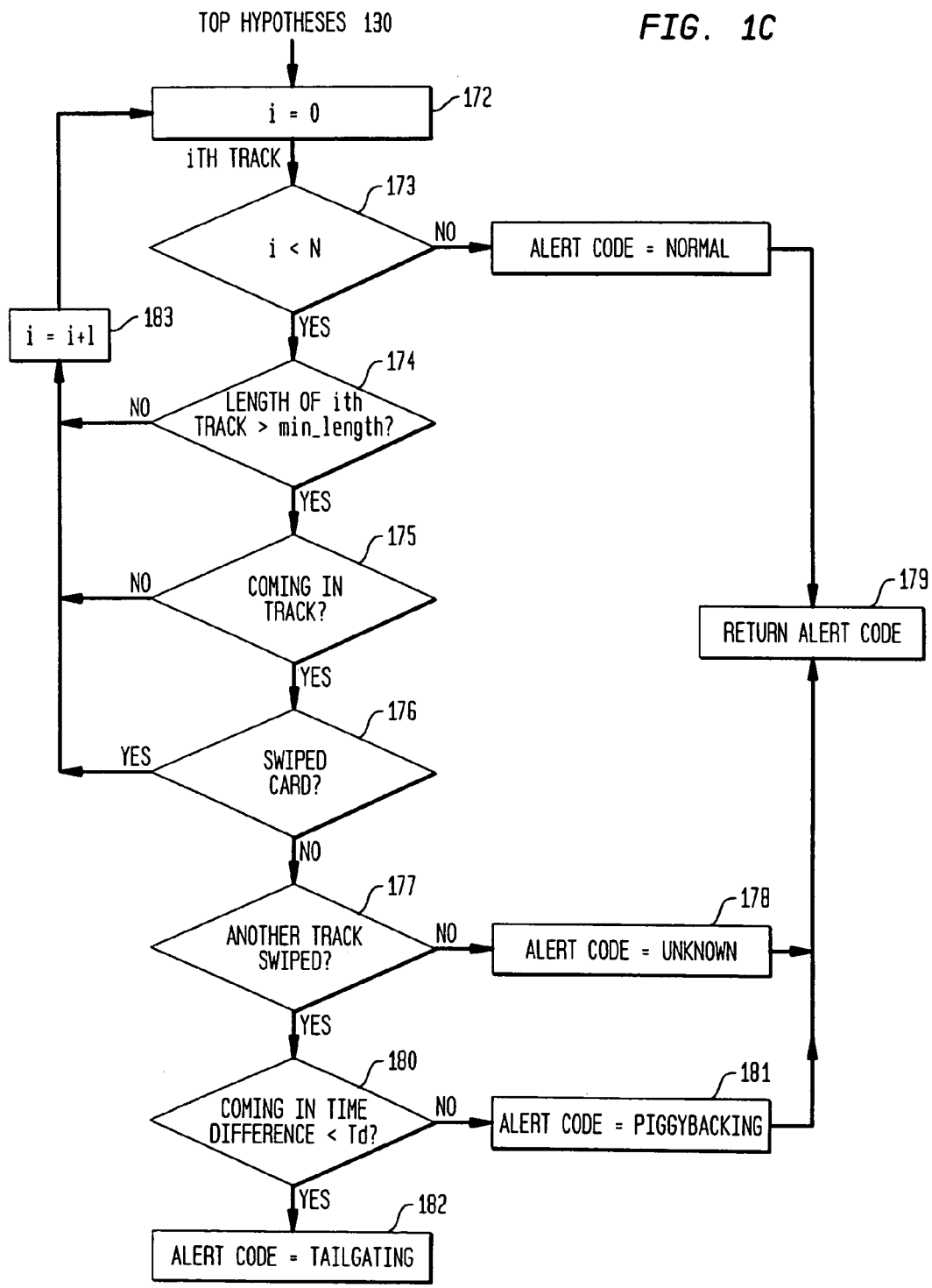
FIG. 1C is a flow diagram illustrating the operation of the alert reasoning portion of the system in detecting the occurrence of the alert conditions referred to as tailgating and piggy-backing.

FIG. 1C is a flow diagram illustrating the operation of alert reasoning 132 in detecting the occurrence of tailgating or piggy-backing responsive to top hypothesis 130. The number of trajectories in the top hypothesis is N. The track number is started at i=0 at 172. When it is determined at 173 that not all of the top tracks have yet been run through the alert reasoning module, then the process proceeds to 174. At 174, it is determined whether the length of the ith track is greater than a minimum length. If it is not, this means that the track is not long enough to be confirmed as indeed a real track, in which case the process moves to increment to the next track in the list at 183. If the ith track is determined to be greater than the minimum length, it is determined whether the ith track is a "coming in" track at 175. "Coming in" track means that the motion direction of the track is from door zone 231 or from non-secure area 22 into secure area 23. If it is not, the process goes to 183 to check next track if there is one. Otherwise, at 176, it is determined whether a card was swiped. If it was, there is no alert and the process moves to 183. If there was no swipe, then it is determined at 177 whether a person on another track swiped a card. If not, the alert code is designated "unknown" at 178 because although there was an entry without a swipe, such entry does not fit the tailgating or piggy-backing scenarios and the alert code is communicated to return alert code processing at 179. If there was a swipe, it is determined at 180 whether a "coming in" time difference is less than a time Td. This parameter is a number that can be determined heuristically and can be, for example, the maximum allowed time difference between when a door opens and closes with one card swipe. If the coming in time is greater than Td, then piggy-backing is suspected and designated at 181 and the piggy-backing alert code is communicated to return alert code processing at 179. If the "coming in" time difference is determined to be less than Td, a tailgating alert code is designated at 182 and the tailgating alert code is communication to alert code processing at 179. It is likely that tailgating occurred in this situation because this means that someone on another track had just swiped a card and had entered and possibly left the door open for the person on the "coming in" track.

The following table is a list of alert conditions, including tailgating and piggy-backing, that the system may be programmed to detect. It will be seen from this table that, although not shown in FIGS., it is possible to detect certain alert conditions using a camera whose area under surveillance is the non-secure area, e.g., area 22. The table uses the following symbols: A=Person A; B=Person B; L(A)=Location of person A; L(B)=Location of person B; S=Secure Area; N=Non-Secure Area.

The timing for Piggybacking is that one person's enter time is close to another person's enter-swipe-time and, in fact, is less than Td.

| Alert Condition | Definition | Scenario | Camera |
|---|---|---|---|
| Entry Tailgating | More than one person enters secure area on single entry card. | L(A) = N, L(B) = N; A cards in; L(A) = S, L(B) = S. | N or S |
| Reverse Entry Tailgating | One person enters the secure area while another exits on a single exit card. | L(A) = S, L(B) = N; A cards out; L(A) = N, L(B) = S. | N or S |
| Entry Collusion | One person uses card to allow another person to enter without entering himself. | L(A) = N, L(B) = N; A cards in; L(A) = N, L(B) = S. | N |
| Entry on Exit Card (Piggybacking) | Person in secure area uses card to allow another person to enter without leaving himself. | L(A) = S, L(B) = N; A cards out; L(A) = S, L(B) = S. | S |
| Failed Entry/Loitering at Entry | Person in non-secure area tries to use a card to open door and fails to gain entry. | L(A) = N; A unsuccessfully attempts to card in | N |
| Loitering in Secure Area | Person in secure area goes to door zone but does not go through | L(A) = N; | S |

In determining whether a particular one of these scenarios has occurred, the system uses a) trajectory length, trajectory motion over time and trajectory direction derived from the top hypothesis and b) four time measurements. The four time measures are enter-door-time, leave-door time, enter-swipe-time and leave-swipe time. These are, respectively, the points in time when a person is detected as having entered the door zone, left the door zone, entered the swipe and left the swipe zone, respectively. In this embodiment the system does not have access to electronic signals associated with the door opening/closing or with card swiping. The computer that carries out the invention is illustratively different from, and not in communication with, the computer that validates the card swiping data and unlocks the door. Thus in the present embodiment, the fact that someone may have opened the door or swiped their card is inferred based on their movements. Thus the designations "A cards in" and "A cards out" in the scenarios are not facts that are actually determined but rather are presented in the table as a description of the behavior that is inferred from the tracking/timing data.

As described above relative to FIG. 1C, timing also plays a role in the applying at least some of the scenarios shown in the table in that people must enter and/or leave certain zones within certain time frames relative to each other in order for their movements to be deemed suspicious. Thus in order to decide, based on data from a camera in the secure area, that Entry Tailgating may have occurred, the difference between door-entry-time for one person and the door-entry-time for another person must be less than Td. That is, people who enter at times that are very far apart are not likely to be guilty of tailgating. If the camera is in the non-secure zone, the difference between door-leave-time for one person and the door-leave-time for another person must be less than Td.

The timing for Reverse Entry Tailgating requires that one person's door-leave-time is relatively close to another person's enter-door-time.

The timing for Failed Entry/Loitering at Entry as well as for Loitering in Secure Area is that a person is seen in the swipe zone for at least a minimum amount of time, combined with the observance of a U-turn type of trajectory, i.e., the person approached the swipe zone, stayed there and then turned around and left the area.

In any of these scenarios in which the behavior attempted to be detected involves observing that a person has entered either the door zone or the swipe zone, the time that the person spends in that zone needs to be greater than some minimum so that the mere fact that someone quickly passes through a zone—say the swipe zone within the secure area—on their way from one part of the secure zone to another will not be treated as a suspicious occurrence.

Image Processing and Hypothesis Overview

Returning again to FIG. 1A, the basic components of image processing 103, leading to the generation of top hypothesis 130, are shown. In particular, the information in each video frame is digitized 104 and a background subtraction process 106 is performed to separate background from foreground, or current, information. The aforementioned frame rate of 10 frames/second can be achieved by running camera 102 at that rate or, if the camera operates at a higher frame rate, by simply capturing and digitizing only selected frames.

Background information is information that does not change from frame to frame. It therefore principally includes the physical environment captured by the camera. By contrast, the foreground information is information that is transient in nature. Images of people walking through the area under surveillance would thus show up as foreground information. The foreground information is arrived at by subtracting the background information from the image. The result is one or more clusters of foreground pixels referred to as "blobs."

Each foreground blob 108 is potentially the image of a person. Each blob is applied to a detection process 110 that identifies human forms using a convolutional neural network that has been trained for this task. More particularly, the neural network in this embodiment has been trained to recognize the head and upper body of a human form. The neural network generates a score, or probability, indicative of the probability that the blob in question does in fact represent a human. These probabilities preferably undergo a non-maximum suppression in order to identify a particular pixel that will be used as the "location" of the object. A particular part of the detected person, e.g., the approximate center of the top of the head, is illustratively used as the "location" of the object within the area under surveillance. Further details about the neural network processing are presented hereinbelow.

Other object detection approaches can be used. As but one example, one might scan the entire image on a block-by-block or other basis and apply each block to the neural network in order to identify the location of humans, rather than first separating foreground information from background information and only applying foreground blobs to the neural network. The approach that is actually used in this embodiment, as described above, is advantageous, however, in that it reduces the amount of processing required since the neural network scoring is applied only to portions of the image where the probability of detecting a human is high.

On the other hand, certain human objects that were detected in previous frames may not appear in the current foreground information. For example, if a person stopped moving for a period of time, the image of the person may be relegated to the background. The person will then not be represented by any foreground blob in the current frame. One way of obviating this problem was noted above: simply apply the entire image, piece-by-piece, to detection process 110 rather than applying only things that appear in the foreground. But, again, that approach requires a great deal of additional processing.

The system addresses this issue by supplying detection process 110 with the top hypothesis 130, as shown in FIG. 1A at 134. Based on the trajectories contained in the top hypothesis, it is possible to predict the likely location of objects independent of their appearance in the foreground information. In particular, one would expect to detect human objects at locations in the vicinity of the ending points of the top hypothesis's trajectories. Thus in addition to processing foreground blobs, detection process 110 processes clusters of pixels in those vicinities. Any such cluster that yields a high score from the neural network can be taken as a valid human object detection, even if not appearing the foreground. This interaction tightly integrates the object detection and tracking, and makes both of them much more reliable.

The object detection results 112 are refined by optical flow projection 114. The optical flow computations involve brightness patterns in the image that move as the detected objects that are being tracked move. Optical flow is the apparent motion of the brightness pattern. Optical flow projection 114 increases the value of the detection probability (neural network score) associated with an object if, through image analysis, the detected object can, with a high degree of probability, be identified to be the same as an object detected in one or more previous frames. That is, an object detected in a given frame that appears to be a human is all the more likely to actually be a human if that object seems to be the displaced version of a human object previously detected. In this way, locations with higher human detection probabilities are reinforced over time. Further details about optical flow projection can be found, for example, in B. T. P. Horn, *Robot Vision*, M.I.T. Press 1986.

The output of optical flow projection 114 comprises data 118 about the detected objects, referred to as the "object detection data." This data includes not only the location of each object, but its detection probability, information about its appearance and other useful information used in the course of the image processing as described below.

The data developed up to any particular point in time, e.g., a point in time associated with a particular video frame, will typically be consistent with multiple different scenarios as to a) how many objects of the type being tracked, e.g., people, are in the area under surveillance at that point in time and b) the trajectories that those objects have followed up to that point in time. Hypothesis generation 120 processes the object detection data over time and develops a list of hypotheses for each of successive points in time, e.g., for each video frame. Each hypothesis represents a particular unique interpretation of the object detection data that has been generated over a period of time. Thus each such hypothesis comprises a particular number, and the locations, of objects of the type being tracked that, for purposes of that hypothesis, are assumed to be then located in the area under surveillance, and b) a particular assumed set of trajectories, or tracks, of that detected objects have followed.

As indicated at 124, each hypothesis is given a score, referred to herein as a likelihood, that indicates the likelihood that that particular hypothesis is, indeed, the correct one. That is, the value of each hypothesis's likelihood is a quantitative assessment of how likely it is that a) the objects and object locations specified in that hypothesis are the objects locations of the objects that are actually in the area under surveillance and b) the trajectories specified in that hypothesis are the actual trajectories of the hypothesis's objects.

Hypothesis management 126 then carries out such tasks as rank ordering the hypotheses in accordance with their likelihood values, as well as other tasks described below. The result is an ordered hypothesis list, as indicated at 128. The top hypothesis 130 is the hypothesis whose likelihood value is the greatest. As noted above, the top hypothesis is then used as the input for alert reasoning 132.

The process then repeats when a subsequent frame is processed. Hypothesis generation 120 uses the new object detection data 118 to extend each hypothesis of the previously generated ordered hypothesis list 128. Since that hypothesis list is the most recent one available at this time, it is referred to herein as the "current hypothesis list." That is, the trajectories in each hypothesis of the current hypothesis list are extended to various ones of the newly detected objects. As previously noted, the object detection data developed for any given frame can almost always support more than one way to correlate the trajectories of a given hypothesis with the newly detected objects. Thus a number of new hypotheses may be generated, or "spawned," from each hypothesis in the current hypothesis list.

It might be thought that what one should do after the hypotheses have been rank-ordered is to just retain the hypothesis that seems most likely—the one with the highest likelihood value—and forget about the rest. However, further image detection data developed in subsequent frames might make it clear that the hypothesis that seemed most likely—the present "top hypothesis"—was in error in one or more particulars and that some other hypothesis was the correct one.

More particularly, there are many uncertainties in carrying out the task of tracking multiple objects in a area under surveillance if single frames are considered in isolation. These uncertainties are created by such phenomena as false detections, missing data, occlusions, irregular object motions and changing appearances. For example, a person being tracked may "disappear" for a period of time. Such disappearance may result from the fact that the person was occluded by another person, or because the person being tracked bent over to tie her shoelaces and thus was not detected as a human form for some number of frames. In addition, the object detection processing may generate a false detection, e.g., reporting that a human form was detected a particular location when, in fact, there was no person there. Or, the trajectories of individuals may cross one another, creating uncertainty as to which person is following which trajectory after the point of intersection. Or people who were separated may come close together and proceed to walk close to one another, resulting in the detection of only a single person when in fact there are two.

However, by maintaining multiple hypotheses of object trajectories, temporally global and integrated tracking and detection are achieved. That is, ambiguities and uncertainties can be generally resolved when multiple frames are taken into account. Such events are advantageously handled by postponing decisions as to object trajectories—through the mechanism of maintaining multiple hypotheses associated with each frame—until sufficient information is accumulated over time.

An example involving the hypothesis shown in FIG. 3A that was introduced and hereinabove shows how such contingencies can lead to different hypotheses.

In particular, as previously noted, FIG. 3A depicts an hypothesis is associated with a video frame, identified by the frame number i+4. As seen in the rightmost portion of the FIG., four detected objects, represented by respective ones of graphical nodes 302 were detected in frame i+4 and it has been determined—by having tracked those objects through previous frames, including frames i, i+1, i+2 and i+3—that those objects followed the particular trajectories formed by the connections 304 from one frame to the next.

An individual one of connections 304 is an indication that, according to the particular hypothesis in question, the two linked nodes 302 correspond to a same object appearing and being detected in two temporally successive frames. The manner in which is this determined is described at a more opportune point in this description.

To see how the hypothesis represented in FIG. 3A was developed, we turn our attention back to frame i. In particular, this hypothesis had as its progenitor in one of the list of hypotheses 128 that was developed for frame i. That hypothesis included four detected objects A, B, C and D and also included a particular set of trajectories 301 that those objects were hypothesized to have followed up through frame i. The four objects A through D are shown in straight vertical line only because the FIG. is a combination spatial and temporal representation. Time progresses along the x axis and since those four objects were detected in frame i, they are vertically aligned in the FIG. In actuality, the objects detected in a given frame can appear in any location with the area under surveillance.

The reason that the objects detected in a given frame are given different letter designations from those in other frames is that it is not known to a certainty which objects detected in a given frame are the same as which objects detected in previous frames. Indeed, it is the task of the multiple-hypothesis processing disclosed herein to ultimately figure this out.

Some number of objects 302 were thereafter detected in frame i+1. It may have been, for example, four objects. However, let it be assumed that the object detection data for frame i+1 is such that a reasonable scenario is that one of those four detections was a false detection. That is, although optical flow projection 114 might have provided data relating to four detected objects, one of those may have been questionable, e.g., the value of its associated detection probability was close to the borderline between person and non-person. Rather than make a final decision on this point, the multiple-hypothesis processing entertains the possibility that either the three-object or the four-object scenario might be the correct one. Hypothesis processing associated with frames following frame i+1 can resolve this ambiguity.

It is the three-object scenario that is depicted in FIG. 3A. That is, it is assumed for purposes of the particular hypothesis under consideration that there were only three valid object detections in frame i+1: E, F and G. Moreover, the processing for this has proceeded on the theory that object E detected at frame i+1 is the same as object A detected at frame i. Hence this hypothesis shows those objects as being connected. The scenario of this hypothesis further includes a so-called merge, meaning that both of the objects B and C became object F. This could happen if, for example, object B walked "behind" (relative to camera 102) object C and was thus occluded. The scenario further has object G being the same as object D.

As we will see shortly, the scenario depicted in FIG. 3A, the above is but one of several possible trajectory stories explaining the relationship between objects A through D detected in frame i and objects E though G detected in frame i+1.

Proceeding to frame i+2, the object detection data from optical flow projection 114 has provided as one likely scenario the presence of five objects H through L. In this hypothesis, objects H and J both emerged from object E that was detected in frame i+1. This implies that both objects A and E represent two people walking closely together, but were not distinguishable as being two people until frame i+2. Objects K and L are hypothesized as being the same as objects F and G. Object I is hypothesized as being a newly appearing object that hadn't followed any of the previously identified trajectories, this being referred to as a trajectory initialization.

Four objects M through P were detected in frame i+3. The hypothesis of FIG. 3A hypothesizes that objects M, O and P detected in frame i+3 are objects I, L and J, respectively, detected in frame i+2. Thus respective ones of the connections 304 extend the trajectories that had ended at objects I, L and J in frame i+2 out to objects M, O and P, respectively in frame i+3. The scenario represented by this hypothesis does not associate any one of the detected objects M through P with either object H or object K. This can mean either that one or both of the objects H and K a) have actually disappeared from the area under surveillance or that b) they are actually in the area under surveillance but, for some reason or another, the system failed to detect their presence in frame i+3. These possibilities are not arrived at arbitrarily but, rather, based on the certain computations that make them sufficiently possible as to not being able to be ruled out at this point. Moreover, the scenario represented by this hypothesis does not associated object N with any of the objects detected in frame i+2. Rather, the scenario represented by this hypothesis embodies the theory that object N is a newly appearing object that initiates a new trajectory.

In frame i+4, four objects Q through T are detected. The object detection data associated with these objects supports a set of possible outcomes for the various trajectories that have been being tracked to this point and the hypothesis. The scenario of FIG. 3A is a particular one such set of outcomes. In particular, in this hypothesis objects R, S and T are identified as being objects M, O and P detected in frame i+3. The object detection data also supports the possibility that object Q is actually object H, meaning that, for whatever reason, object H was not detected in frame i+3. For example, the person in question may have bent down to tie a shoelace and therefore did not appear to be a human form in frame i+3. The data further supports the possibility that none of the objects Q through T is the same as object N. At this point object N would appear to have been a false detection. That is, the data supports the conclusion that although optical flow projection 114 reported the presence of object N, that object did not actually exist. The data further supports the possibility that none of the objects Q through T is the same as object K. At this point object K would appear to truly have disappeared from the area under surveillance.

All of the foregoing, it should be understood, is only one of numerous interpretations of what actually occurred in the area under surveillance over the frames in question. At each frame, any number of hypothesis can be spawned from each hypothesis being maintained for that frame. In particular, the data that supported the scenario shown in FIG. 3A leading to the hypothesis shown for frame i+4 was also supportive of a different scenario, leading to many other hypotheses for frame i+4.

Figure 3B:
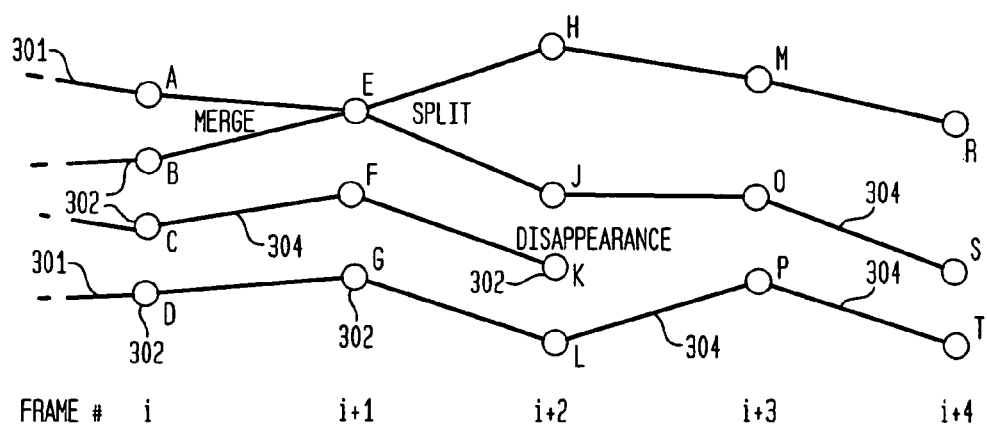

FIG. 3B shows one such alternative scenario. In particular, the data in frame i+1 supported the possibility that the trajectory of object B merged into object E instead of into object F, leading to a different hypothesis for frame i+1 in which that merger is assumed. Moreover, the data for frame i+2 supported the possibility that object I was a false detection. Thus the depicted chain of hypothesis does not include object I at all. The data for frame i+3 supported the possibility that object M, rather than being the same as object I, was really object H and that objects O and P were actually objects J and L instead of the other way around. The data for frame i+3 also supported the possibility that object Q was a false detection.

Figure 4:
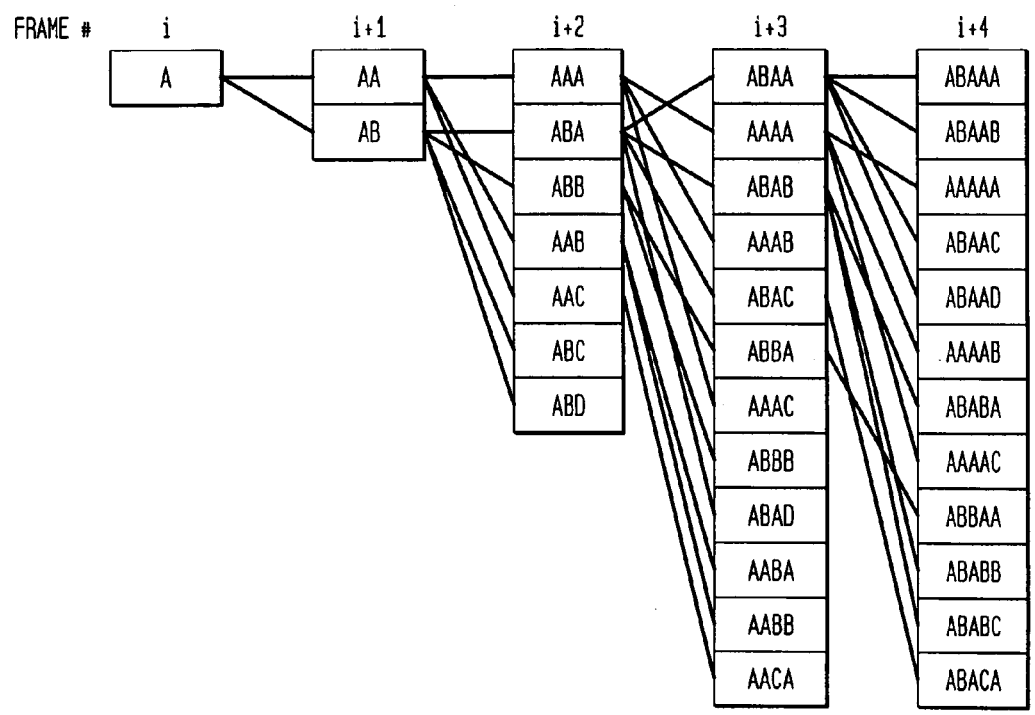
FIG. 4 is a generalized picture illustrating the process by which each of the hypotheses generated for a particular video frame can spawn multiple hypotheses and how the total number of hypotheses is kept to manageable levels

FIG. 4 is a more generalized picture illustrating the process by which each of the hypotheses generated for a particular frame can spawn multiple hypotheses and how the total number of hypotheses is kept to manageable levels. It is assumed in this example, that the hypothesis list for a certain ith frame contains only one hypothesis. For example, after a period of time when no human objects were detected, a single human form appears in frame i. The single hypothesis, denominated A, associated with this frame contains that single object and no associated trajectory, since this is the first frame in which the object is detected. Let us assume that in the next frame i+1, two objects are detected. Let us also assume that the object detection data for frame i+1 supports two possible hypotheses, denominated AA and AB. Hypothesis AA associates the originally detected person with one of the two people appearing in frame i+1. Hypothesis AB associates the originally detected person with the other of the two people appearing in frame i+1. Hypothesis AA is at the top of the hypothesis list because, in this example, its associated likelihood is greater than that associated with hypothesis AB.

In frame i+2 some number of objects are again detected. Even if only two objects are detected, the data may support multiple scenarios associating the newly detected objects with those detected in frame i+2. It is possible that neither of the two people detected in frame i+2 is the one detected in frame i. That is, the person detected in frame i may have left the area under surveillance and yet a third person has appeared. Moreover, each of the people detected in frame i+2 might be either of the people that were detected in frame i+1. Thus each of the hypotheses AA and AB can, in turn, give rise to multiple hypotheses. In this example, hypothesis AA gives rise to three hypotheses AAA AAB, and AAC and hypothesis AB gives rise to four hypotheses ABA, ABB, ABC and ABD. Each of those seven hypotheses has its own associated likelihood. Rank ordering them in accordance with their respective likelihoods illustratively has resulted in hypothesis AAA being the top hypothesis, followed by ABA, ABB, AAB, AAC, ABC and ABD.

The process proceeds similarly through successive frames. Note how in frame i+3, the top hypothesis ABAA did not originate from the hypotheses that was the top hypothesis in frames i+1 and i+2. Rather, it has eventuated that frame i+3's top hypothesis evolved from the second-most-likely hypotheses for frame i+1, AB, and the second-most-likely hypotheses from frame i+2, ABA. In this way, each of the multiple hypotheses is either reinforced, eliminated or otherwise maintained as frames are sequentially analyzed over time.

Inasmuch as the data developed in each frame can support multiple extensions of each of the hypotheses developed in the previous frame, the total number of hypotheses that could be generated could theoretically grow without limit. Thus another function of hypothesis management 126 is to prune the hypothesis list so that the list contains only a tractable number of hypotheses on an ongoing basis. For example, hypothesis management 126 may retain only the M hypotheses generated by hypothesis generation 120 that have the highest likelihood values. Or hypothesis management 126 may retain only those hypotheses whose likelihood exceeds a certain threshold.

In the example of FIG. 4, only the top 12 hypotheses are retained. Thus it is seen that none of the hypotheses that spawned from the two lowest-ranking hypotheses in frame i+2—ABC and ABD—have made the top-twelve list in frame i+3. And in frame i+42, the top 12 hypotheses evolved from only the top six hypothesis in frame i+3's hypothesis list.

Hypothesis Generation, Likelihood Generation and Hypothesis Management

With the foregoing as an overview, we are now in a position to see how the hypotheses are generated from one frame to the next, how the likelihoods of each hypothesis are computed, and how the hypotheses are managed.

Given a particular trajectory within a given hypothesis, one must consider the possibility that that trajectory connects to any one or more of the objects detected in the present frame, the latter case being a so-called split as seen in FIGS. 3A and 3B. One must also consider the possibility that the trajectory in question does not connect to any of the objects detected in the present frame—either because the object that was on the trajectory has left the area under surveillance or because it has not left the area under surveillance but was not detected in this particular frame.

Moreover, given a particular object detected in the current frame, one must consider the possibility that that object connects to any one or more of the trajectories of a given hypothesis, the latter case being a so-called merge as seen in FIGS. 3A and 3B. One must also consider the possibility that object in question does not connect to any of the trajectories of the given hypothesis, meaning that the object has newly appeared in the area under surveillance and a new trajectory is being initiated. One must also consider the possibility that the detected object does not actually exist, i.e., the detection process has made an error.

The various "connection possibilities" just mentioned can occur in all kinds of combinations, any one of which is theoretically possible. Each combination of connection possibilities in the current frame associated with a given hypothesis from the previous frame potentially gives rise to a different hypothesis for the current frame. Thus unless something is done, the number of hypotheses expands multiplicatively from one frame to the next. It was noted earlier in this regard that hypothesis management 126 keeps the number of hypotheses in the hypothesis list down to a manageable number by pruning away the hypotheses generated for a given frame with relatively low likelihood values. However, that step occurs only after a new set of hypotheses has been generated from the current set and the likelihoods for each new hypothesis has been computed. The amount of processing required to do all of this can be prohibitive if one generates all theoretically possible new hypotheses for each current hypothesis.

However, many of the theoretically possible hypothesis are, in fact, quite unlikely to be the correct one. The present invention prevents those hypotheses from even being generated by rejecting unlikely connection possibilities at the outset, thereby greatly reducing the number of combinations to be considered and thus greatly reducing the number of hypotheses generated. Only the possibilities that remain are used to form new hypotheses. The process of "weeding out" unlikely connection possibilities is referred to herein as "local pruning."

FIGS. 5 and 6 show a process for carrying out the foregoing. Reference is first made, however, to FIG. 7, which shows a simplified example of how hypotheses are generated.

In particular, FIG. 7 illustrates frame processing for frames i−1, i, and i+1. In order to keep the drawing simple, a simplifying assumption is made that only the top two hypotheses are retained for each frame. In actual practice any workable scheme for keeping the number of hypotheses to a useable level may be used, such as retaining a particular number of hypotheses, or retaining all hypotheses having a likelihood above a particular value. The latter value might itself being varied for different frames, depending on the complexity of the content observed within the frames.

As processing begins for frame (i−1), shown in the first row of FIG. 7, it is assumed that only one hypothesis survived from the previous frame i−2. That hypothesis contains one trajectory 71. It is also assumed that only one object 72 was detected in the frame i−1. There are thus only three possible hypotheses for the frame i−1 referred to in FIG. 7 as "potential hypotheses," stemming from the previous hypothesis. In hypothesis A, object 72 actually connects to trajectory 71. In hypothesis B, object 72 does not connect to the trajectory but, rather, initiates a new trajectory. In hypothesis C, the detection was a false detection, so that object 72 does not exist in hypothesis C. Note that hypothesis C also takes account of another connection possibility that is always theoretically possible—namely that trajectory 71 does not connect to any objects detected in the current frame.

The processing is based on a parameter referred to as a connection probability ConV computed for each detected object/trajectory pair. The connection probability, more particularly, is a value indicative of the probability that the detected object is the same as the object that terminates a particular trajectory. Stated another way, the connection probability is indicative of the likelihood that the detected object is on the trajectory in question. The manner in which ConV can be computed is described below.

As the processing proceeds, it is determined, for each connection probability ConV, whether it exceeds a so-called "strong" threshold Vs, is less than a so-called "weak" threshold Vw or is somewhere in between. A strong connection probability ConV, i.e., ConV>Vs, means that it is very probable that the object in question is on the trajectory in question. In that case we do not allow for the possibility that the detected object initiates a new trajectory. Nor do we allow for the possibility that the detected object was a false detection. Rather we take it as a given that that object and that trajectory are connected. If the connection probability is of medium strength—Vw<ConV<Vs—we still allow for the possibility that the object in question is on the trajectory in question, but we also allow for the possibility that the detected object initiates new trajectory as well as the possibility that there was a false detection. A weak ConV, i.e., ConV<Vw means that it is very improbable that the object in question is on the trajectory in question. In that case we take it as a given that they are not connected and only allow for the possibility that the detected object initiates new trajectory as well as the possibility that there was a false detection.

In the present case, we assume a strong connection between the terminating object of trajectory 71 and object 72. That is, ConV>Vs. As just indicated, this means that the probability of object 72 being the object at the end of trajectory 71 is so high that we do not regard it as being at all likely that object 72 is a newly appearing object. Therefore, potential hypothesis A is retained and potential hypothesis B is rejected. As also just noted, the processing does not allow initializations for strong connections or false detections. Therefore potential hypothesis C is rejected as well. The process of rejecting potential hypotheses B and C is what is referred to hereinabove as "local pruning." The ordered hypothesis list thus includes only hypothesis A.

As processing begins for frame i, shown in the second row of FIG. 7, we have only the one hypothesis—hypothesis A—from the previous frame to work with. That hypothesis contains one trajectory 73. However, two objects 74 and 75 are detected in this frame. There are thus more connection possibilities. In particular, we have for object 74 the possibility that it connects to trajectory 73; that it starts its own trajectory; and that it was a false detection. We have the same possibilities for object 75. We also must consider various combinations of these, including the possibility that both objects 74 and 75 connect to trajectory 73. We also have the possibility that trajectory 73 does not connect to either of objects 74 and 75. There are thus a total of nine potential hypotheses AA, AB, AC, AD, AE, AF, AG, AH and AI. The depiction of overlapping trajectory nodes of potential hypothesis AD is indicative of the fact that this potential hypothesis comprises two trajectories both of which are extensions of trajectory 73 and which split at the ith frame.

Objects 74 and 75 have respective connection probabilities ConV1 and ConV2 with the terminating object of trajectory 73. Different combinations of these two values will generate different local pruning results. We assume ConV1 is very strong (ConV1>Vs). As a result, any potential hypotheses in which object 74 is not present or in which object 74 starts its own trajectory do not survive local pruning, these being hypotheses AB, AC, AE, AF, AH and AI. Thus at best only hypotheses AA, AD and AG survive local pruning. Assume, however, that ConV2 is neither very strong nor very weak. That is Vw<ConV2<Vs. In this case we will entertain the possibility that object 75 is connected to trajectory 73 but we do not rule out the possibility that it starts its own hypothesis or that was a false detection. Thus of the hypotheses AA, AD and AG remaining after considerations relating to object 74, none of those potential hypotheses are rejected after considering object 75. If ConV2 had been greater than Vs; only hypothesis AD would have survived local pruning.

It is assumed that hypotheses AD and AG had the two highest likelihood values. Thus they are the two hypotheses to be retained in the hypothesis list for frame i.

As processing begins for frame i+1, shown in the third row of FIG. 7, we have two hypotheses—hypotheses AD and AG—from the previous frame to work with. It is assumed that only one object was detected in this frame. The potential hypotheses include hypotheses that spawn both from hypothesis AD and from hypothesis AG. Each of the hypotheses AD and AG can potentially spawn five hypotheses in frame i+1.

Considering first hypothesis AD, which comprises trajectories 76 and 77, it will be seen that object 80 can potentially connect to the terminating object of trajectory 76 (potential hypothesis ADA), to the terminating object of trajectory 77 (ADB), to the terminating object of both trajectories (ADC) or to neither (ADD). In addition, object 80 could potentially be a false detection (ADE). So there are a total of five hypotheses that potentially could derive from hypothesis AD.

Hypothesis AG also comprises two trajectories. One of these is the same upper trajectory 76 as is in hypothesis AD. The other is a new trajectory 79 whose starting node is object 75. Thus in a similar way a total of five hypotheses can potentially derive from hypothesis AG—AGA, AGB, ABC, AGD and AGE.

Note that the objects that terminate the two trajectories of potential hypothesis AD are the same objects that terminate the two trajectories of potential hypothesis AG. These are, in fact, objects 74 and 75. Let ConV1 represent the connection probability between the terminating object of trajectory 76 and detected object 80. Let ConV2 indicate the connection probability between object 80 and the terminating objects of trajectories 77 and 79 (both of which are object 75). First, assume ConV1 is neither too strong (>Vs) nor too weak (<Vw). Therefore, ADA, AGA, ADD, AGD, ADE, AGE survive local pruning. Next, assume ConV2<Vw. In this case ADB, ADC, AGB, and AGC do not survive local pruning.

Note that a difference between hypotheses AD and AG, which are the survivors at the end of frame i, is based on whether object 75 is connected to the prior trajectory or not. Therefore, in frame i+1, it may be that if the 1 st, 4th and 5th potential hypotheses derived from AD are the ones that survive local pruning (that is ADA, ADD and ADE survive), then the 1$^{st}$, 4th and 5th hypotheses derived from AG would also survive (that is AGA, AGD and AGE). This is because local pruning is only concerned with the connection probability between two objects. The question of whether object 75 is or is not connected to the prior trajectory is not taken into account.

The various factors that go into computing the likelihoods for the various hypotheses are such that even if ADA has the highest likelihood, this does not necessary mean that AGA has the next highest likelihood. In this example, in fact, AGD has the highest likelihood value and so it survives while AGA does not.

Returning now to FIG. 5, this FIG. shows a process carried out by hypothesis generation 120 (FIG. 1A) in order to implement the local pruning just described.

It is assumed in FIG. 5 that there are M hypotheses in the current hypothesis list, i.e., the hypothesis list that was generated based on the data from the previous frame. The various hypotheses are represented by an index j, j=0, 1, 2, . . . (M−1). The process of FIG. 5 considers each of the M hypotheses in turn, beginning with j=0 as indicated at 501. At this time j<M. Thus the process proceeds through 502 to 503.

Each hypothesis illustratively comprises N trajectories, or tracks, where the value of N is not necessarily the same for each hypothesis. The various trajectories of the jth hypothesis are represented by an index i, i=0, 1, 2 . . . (N−1). Index i is initially set to 0 at 503. At this time i<N. Thus the process proceeds through 504 to 506. At this point we regard it as possible that the object following the ith track will not be detected in the current frame. We thus set a parameter referred to as ith-track-missing-detection to "yes."

There are illustratively K objects detected in the current frame. Those various objects are represented by an index k, where k=0, 1, 2, . . . (K−1). In a parallel processing path to that described so far, index k is initially set to 0 at 513. Since k<K at this time, the process proceeds through 516 to 509. At this point we regard it as possible that the kth object may not be connected to any of the trajectories of the jth hypothesis and we also regard it as possible that the kth object may be a false detection. We thus set the two parameters kth-object-new-track and kth-object-false-detection to the value "yes."

The ith track and the kth object are considered jointly at 511. More particularly, their connection probability ConV is computed. As will be appreciated from the discussion above, there are three possibilities to be considered: ConV>Vs, Vw<ConV<Vs, and ConV<Vw.

If ConV>Vs, that is the connection probability is strong, processing proceeds from decision box 521 to box 528. It is no longer possible—at least for the hypothesis under consideration—that the ith track will have a missed detection because we take it as a fact that the kth object connects to the ith trajectory when their connection probability is very strong. In addition the strong connection means that we regard it as no longer possible that the kth object starts a new track or that the kth object was a false detection. Thus the parameters as ith-track-missing-detection, kth-object-new-track and kth-object-false-detection are all set to "no." We also record at 531 the fact that a connection between the kth object and the ith track is possible.

If ConV is not greater than Vs, we do not negate the possibility that the ith track will have a missed detection, or that the kth object will start a new track or that the kth object was a false detection. Thus processing does not proceed to 528 as before but, rather to 523, where it is determined if ConV<Vw. If it is not the case that ConV<Vw; there is still a reasonable possibility that the kth object connects to the ith trajectory and this fact is again taken not of at 531.

If ConV<Vw, there is not a reasonable possibility that the kth object connects to the ith trajectory. Thus box 531 is skipped.

The process thereupon proceeds to 514, where the index i is incremented. Assuming that i<N once again, processing proceeds through 504 to 506 where the parameter as ith-track-missing-detection is set to "yes" for this newly considered trajectory. The connection probability between this next track and the same kth object is computed at 511 and the process repeats for this new trajectory/object pair. Note that if the kth object has a strong connection with any of the trajectories of this hypothesis, box 528 will be visited at least once, thereby negating the possibility of the kth object initiating a new track or being regarded as a false detection—at least for the jth hypothesis.

Once the process has had an opportunity to consider the kth object in conjunction with all of the tracks of the jth hypothesis, the value of k is incremented at 515. Assuming that k<K, the above-described steps are carried out for the new object.

After all of the K objects have been considered in conjunction with all of the trajectories of the jth hypothesis, the process proceeds to 520 where new hypotheses based on the jth hypothesis are spawned. The value of j is incremented at 517 and the process repeats for the next hypothesis until all the hypotheses have been processed.

FIG. 6 is an expanded version of step 520, indicating how the data developed during the processing carried out in FIG. 5 is used to spawn the new hypotheses. In particular, the new hypotheses are spawned by forming all extensions of the jth hypothesis having all possible combinations of object/trajectory pairs, unextended trajectories, unconnected objects and missing objects, that survive local pruning. That is, the new hypotheses are spawned by considering all possible combinations of a) the object/trajectory pairs identified at step 531;
b) unextended trajectories, i.e., trajectories for which the parameter ith-track-missing-detection retains the value "yes" that was assigned at 506;
c) unconnected objects, i.e., objects for which the parameter kth-object-new-track retains the value "yes" that was assigned at 509; and
d) missing objects, i.e., objects for which the parameter kth-object-false-detection retains the value "yes" that was assigned at 509.

It was previously indicated that hypothesis management 126 rank orders the hypotheses according to the their likelihood values and discards all but the top ones. It also deletes the tracks of hypotheses which are out-of-date, meaning trajectories whose objects have seemingly disappeared and have not returned after a period of time. It also keeps trajectory lengths to no more than some maximum by deleting the oldest node from a trajectory when its length becomes greater than that maximum. Hypothesis management 126 also keeps a list of active nodes, meaning the ending nodes, or objects, of the trajectories of all retained hypotheses. The number of active nodes is the key number of determining the scale of graph extension, therefore, a careful managing step assures efficient computation.

FIG. 8, more particularly, shows the above-mentioned processing within hypothesis management 126. The process begins by retrieving, identifying or accessing the hypothesis list generated by hypothesis generation 120. These hypotheses 601 are preferably ordered according to their likelihood or probability of occurrence at 602. After pruning away the unlikely hypotheses—those with relatively low likelihood values—M hypotheses remain. An hypothesis index j is set to 0 at 603. At 604, it is determined if that all of the hypotheses have been worked through. If not, the process proceeds to consider the N trajectories of the jth hypothesis, beginning by setting i=0 at 605. It is then determined at 607 whether the track stop time—meaning the amount of time that has passed since a detected object was associated with the ith track—is greater than a track stop time limit Ts. If it has; the ith track is deleted at 608 for computational and storage efficiency, the theory being that the object being tracked was lost track of or that this was a false track to begin with. If the ith track stop time is determined not to be greater than Ts; at 609, it is determined whether the ith track length is greater than maxL. If the ith track length is determined to be greater than maxL; the oldest node in the track is deleted at 610, again for computational and storage efficiency. If the ith track length is determined not to be greater than maxL at 609; no tracks or nodes in tracks are deleted and the next operation is 611, which is also the next operation after track deletion at 608 or node deletion at 610. At 611, the track is incremented, or i=i+1 and the process returns to 606. When all of the N tracks have been worked through; the process moves on to 612, where it is determined whether the jth hypothesis still has at least one track. It may be case that the last of its tracks were deleted at 608. If the jth hypothesis still includes at least one track; the process goes directly to 613, where the hypothesis index is incremented and the next hypothesis is considered. If the jth hypothesis does not include at least one track, the process goes first to 614 when the jth hypothesis is deleted before moving on to 613.

In summary, the design of this multiple object tracking system follows two principles. First, preferably as many hypotheses as possible are kept and they are made to be as diversified as possible to catch all the possible explanations of image sequences. The decision is preferably made very late to guarantee it is an informed and global decision. Second, local pruning eliminates unlikely connections and only a limited number of hypotheses are kept. This principle helps the system achieve a real-time computation.

Image Processing Details

Connection Probability

Given object detection results from each image, the hypotheses generation 120 calculates the connection probabilities between the nodes at the end of the trajectories of each of the current hypotheses ("maintained nodes") and the new nodes detected in the current frame. Note that the trajectory-ending nodes are not necessarily from the previous frame since there may have missing detections. The connection probability, denoted hereinabove as ConV is denoted in this section as $p_{con}$ and is computed according to, $$p_{con} = w_{appear} \times p_{appear} + w_{pos} \times p_{pos} + w_{size} \times p_{size} \quad (1)$$

where $p_{appear} = 1.0 - DistrDist(hist_1, hist_2)$ $$p_{pos} = 1.0 - e - \frac{\left(\frac{x_2 + flow_x \times p_{flow} - x_1}{size_{x_2}}\right)^2 + \left(\frac{y_2 + flow_y \times p_{flow} - y_1}{size_{x_2}}\right)^2}{a} \quad (2)$$

$$p_{size} = 1.0 - e - \frac{(|diff_x| + |diff_y| + |diff_x - diff_y|)^2}{b}$$

Here $w_{appear}$, $w_{pos}$ and $w_{size}$ are weights in the connection probability computation. That is, the connection probability is a weighted combination of appearance similarity probability, position closeness probability and size or scale similarity probability. DistrDist is a function to compute distances between two histogram distributions. It provides a distance measure between the appearances of two nodes. The parameters $x_1$, $y_1$ and $x_2$, $y_2$ denote the detected object locations corresponding to the maintained node and the detected node in the current image frame, respectively. The parameters $size_{x2}$, $size_{y2}$ are the sizes of the bounding boxes that surround the various detected objects, in x and y directions corresponding to the detected node in the current frame. Bounding boxes are described below. The parameters $flow_x$, $flow_y$ represent the backward optical flows of the current detected node in x and y directions, and $p_{flow}$ is the probability of the optical flow which is a confidence measure of the optical flow computed from the covariance matrix of the current detected node. Therefore, $p_{pos}$ measures the distance between the maintained node $(x_1, y_1)$ and the back projected location of the current detected node $(x_2, y_2)$ according to its optical flow $(flow_x, flow_y)$ which is weighted by its uncertainty $(p_{flow})$. These distances are relative distances between the differences in x and y directions and the bounding box size of the current detected node. The metric tolerates larger distance errors for larger boxes. $diff_x$, $diff_y$ are the differences in the bounding box size of x and y directions, respectively. The parameter $p_{size}$ measures the size differences between the bounding boxes and penalizes the inconsistence in size changes of x and y directions. The parameters a and b are some constants. This connection probability measures the similarity between two nodes in terms of appearance, location and size. We prune the connections whose probabilities are very low for the sake of computation efficiency.

Likelihood Computation

The likelihood or probability of each hypothesis generated in the first step is computed according to the connection probability of its last extension, the object detection probability of its terminating node, trajectories analysis and an image likelihood computation. In particular, the hypothesis likelihood is accumulated over image sequences, $$likelihood_i = \quad (3)$$

$$likelihood_{i-1} + \frac{\sum_{j=1}^{n} -\log(p_{con_j}) - \log(p_{obj_j}) - \log(p_{trj_j})}{n} + l_{img}$$

where i is the current image frame number, n represents the number of objects in current hypothesis. The parameter $p_{conj}$ denotes the connection probability computed in the first step. If the jth trajectory has a missing detection in current frame, a small probability, is assigned to $p_{conj}$. The parameter $p_{objj}$ is the object detection probability and $p_{trjj}$ measures the smoothness of the jth trajectory. We use the average of multiple trajectories likelihood in the computation. The metric prefers the hypotheses with better human detections, stronger similarity measurements and smoother tracks. The parameter $l_{img}$ is the image likelihood of the hypothesis. It is composed of two items, $$l_{img} = l_{cov} + l_{comp} \quad (4)$$

where $$l_{cov} = -\log\left(\frac{\left|A \cap \left(\bigcup_{j=1}^{m} B_j\right)\right| + c}{|A| + c}\right) \quad (5)$$

$$l_{comp} = -\log\left(\frac{\left|A \cap \left(\bigcup_{j=1}^{m} B_j\right)\right| + c}{\left|\sum_{j=1}^{m} B_j\right| + c}\right)$$

Here $l_{cov}$ calculates the hypothesis coverage of the foreground pixels and $l_{comp}$ measures the hypothesis compactness. A denotes the sum of foreground pixels and $B_j$ represents the pixels covered by jth node. The parameter m is the number of different nodes in this hypothesis. $\cap$ denotes the set intersection and $\cup$ denotes the set union. The numerators in both $l_{cov}$ and $l_{comp}$ represent the foreground pixels covered by the combination of multiple trajectories in the current hypothesis. The parameter c is a constant. These two values give a spatially global explanation of the image (foreground) information. They measure the combination effects of multiple tracks in a hypothesis instead of individual local tracking for each object.

More particularly, the hypothesis coverage is a measure of the extent to which regions of an image of the area under surveillance that appear to represent moving objects are covered by regions of the image corresponding to the terminating objects of the trajectories in the associated hypothesis. Those regions of the image have been identified, based on their appearance, as being objects belonging to a particular class of objects, such as people, and, in addition, have been connected to the trajectories in the associated hypothesis. The higher hypothesis coverage, the better, i.e., the more likely it is that the hypothesis in question represents the actual trajectories of the actual objects in the area under surveillance. Basically the hypothesis coverage measures how much of the moving regions is covered by the bounding boxes, generated by the object detector, corresponding to the end points of all the trajectories in the associated hypothesis.

The hypothesis compactness is a measure of the overlapping areas between regions of the image corresponding to the terminating objects of the trajectories in the associated hypothesis. The less overlapping area, the higher the compactness. The compactness measures how compact or efficient the associated hypothesis is to cover the moving regions. The higher the compactness, the more efficient, and so the better, is the hypothesis.

The hypothesis likelihood is a value refined over time. It makes a global description of individual object detection results. Generally speaking, the hypotheses with higher likelihood are composed of better object detections with good image explanation. It tolerates missing data and false detections since it has a global view of image sequences.

There is no computed value of $p_{conj}$ for a trajectory that is newly beginning in the current frame or for a trajectory that is not extended to a newly detected object in the current frame. It is nonetheless desirable to assign a value of $p_{conj}$ for Eq. (3) even in such cases. The probability that those scenarios are correct, i.e., that a trajectory did, in fact, begin or end in the current frame, is higher at the edges of the surveillance field and the door area than in the center because people typically do not appear or disappear "out of nowhere," i.e., in the middle of the surveillance field. Thus an arbitrary, predefined value for $p_{conj}$ can be assigned in these situations. Illustratively, we can assign the value $p_{conj}=1$ for detections or terminated trajectories at the very edge of the surveillance field (including the door zone)m/, and assign increasingly lower values as one gets closer to the center of the surveillance field, e.g., in steps of 0.1 down to the value of 0.1 at the very center.

Object Detection

Some further details about background subtraction 106 and detection process 110 will now be presented.

The object detection itself involves computations of the probabilities of detecting a human object based upon the image pixel values. There are many alternatives to the image pixel values corresponding to head and upper body that may be employed. For example, the unique way that an object may be walking or the juxtaposition of a walking human object's legs and/or arms within image frames may distinguish it from other objects, and generally any feature of one or more parts of the human body that is detectable and distinctly identifiable may be employed. In addition, characteristics of what a human object may be wearing or otherwise that may be associated, e.g., by carrying, pushing, etc., with the moving human object may be used. Particular features of the human face may be used if resolvable. However, in many applications such as multiple object detection and tracking in a area under surveillance of, e.g., over ten meters in each direction, the single fixed camera and imaging technology being used may generally not permit sufficient resolution of facial features, and in some cases, too many human objects in the detected frames will be looking in a direction other than toward the surveillance camera.

All foreground pixels are checked by the object detection module 110. In some frames, there may be no identified objects in the area under surveillance. In frames of interest, one or more pixels will be identified having a probability greater than a predetermined value corresponding to the location of a predetermined portion of a detected object. A detected object will generally occupy a substantial portion of a frame.

An original full image may have multiple scales that are re-sized to different scales. The algorithm includes multiple interlaced convolution layers and subsampling layers. Each "node" in a convolution layer may have 5×5 convolutions. The convolution layers have different number of sub-layers. Nodes within each sub-layer have same configuration, that is, all nodes have same convolution weights. The output is a probability map representing the probabilities of human heads and/or upper torso being located at a corresponding location at some scale. Those probabilities either above a threshold amount or those certain number of highest probabilities are selected as object detections.

Bounding boxes are preferably drawn over the foreground blobs identified as human object detections. These bounding boxes are basically rectangles that are drawn around a selected position of an object. Bounding boxes are generally used to specify location and size of the enclosed object, and they preferably move with the object in the video frames.

Figure 9A:
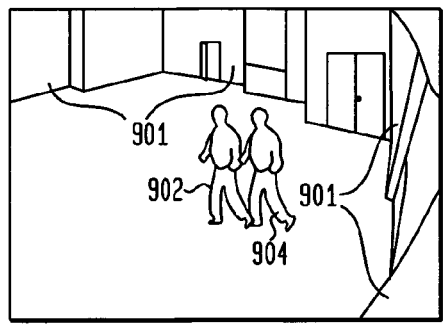

FIG. 9a shows an image captured by the video camera 102 that corresponds to a single frame, and which may be digitized at module 104. Much of the detail captured within the frame includes background 901, which may include static objects and interior items and structure of the area under surveillance that appear in substantially all frames and are not of interest to be tracked in the surveillance algorithm. These "background" items are subtracted pixel by pixel from the frame leaving foreground pixels or blobs generated by adaptive background modeling. The background modeling used in a system in accordance with a preferred embodiment is "adaptive", such that it adapts to changes in lighting, temperature, positions of background objects that may be moved, etc.

Background modeling is illustratively used to identify the image background. This procedure preferably involves an adaptive background modeling module which deals with changing illuminations and does not require objects to be constantly moving or still. Such adaptive background module may be updated for each frame, over a certain number of frames, or based on some other criteria such as a threshold change in a background detection parameter. Preferably, the updating of the background model depends on a learning rate $\rho$, e.g.:

$$\mu_t = (1-\rho)\mu_{t-1} + \rho X_t; \text{ and}$$

$$\sigma_t^2 = (1-\rho)\sigma_{t-1}^2 + \rho(X_t-\mu_t)^T(X_t-\mu_t);$$

where $\mu_t$, $\sigma_t$ are the mean and variation of the Gaussian, and $X_t$ the pixel value at frame t, respectively. Items that are well modeled are deemed to be background to be subtracted. Those that are not well modeled are deemed foreground objects and are not subtracted. If an object remains as a foreground object for a substantial period of time, it may eventually be deemed to be part of the background. It is also preferred to analyze entire area under surveillances at a same time by looking at all of the digitized pixels captured simultaneously.

There are two walking human objects 902 and 904 in the image captured and illustrated at FIG. 9a that are of interest in the detection and tracking algorithm.

Figure 9B:
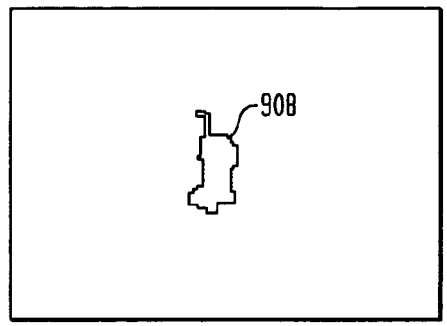

FIG. 9b illustrates a foreground blob 908 corresponding to the two human objects 902 and 904 of the image of FIG. 9a and results from the background subtraction process 106. This foreground blob 908 is analyzed for human object detection.

Figure 9C:
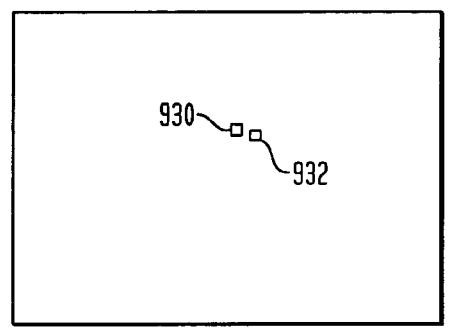

The spots shown in FIG. 9c represent locations that have sufficiently high probabilities of being human objects detected by the convolutional neural network at 110, which have been refined through optical flow projections 114 and undergo non-maximum suppression. Each of the two spots 930 and 932 correspond to one of the two human objects 902 and 904 which were detected. The two spots 930 and 932 shown in FIG. 9c are determined to be situated at particular locations within the frame that corresponds to a predetermined part of the human object, such as the center of the top of the head, or side or back of the head or face, or center of upper torso, etc.

Figure 9D:
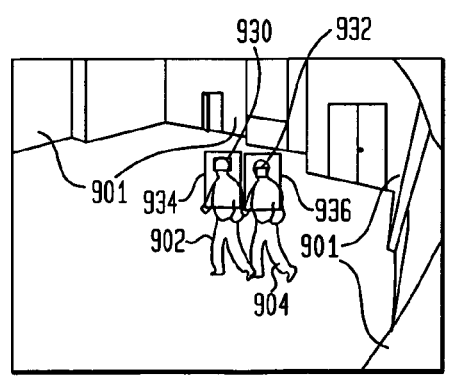

FIG. 9d shows the corresponding bounding boxes 934 and 936 overlaid in the original image over the upper torso and heads of the two human objects 902 and 904. The bounding boxes 934 and 936 have been described above.

Figure 9E:
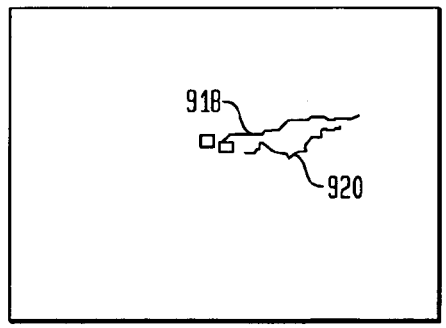

FIG. 9e demonstrates object trajectories 938 and 920 computed over multiple frames. The likely trajectories 938 and 920 illustrated at FIG. 9e show that the two human objects 902 and 904 came from the door zone 903 (see FIGS. 9a and 9d) at almost the same time and are walking away from the door in the area under surveillance. As described earlier, this may be a behavioral circumstance where an alert code may be sent, e.g., if only one of the two people swiped a card and either both people or the other person of the two walked through the door from the non-secure area on the other side.

Experiments

The system has been tested at an actual facility. On six test videos taken at the facility, the system achieves 95.5% precision in events classification. The violation detection rate is 97.1% and precision is 89.2%. The ratio between violations and normal events is high because facility officers were asked to make intentional violations. Table 1 lists some detailed results. The system achieved overall 99.5% precision computed over one week's data. The violation recall and precision are 80.0% and 70.6%, respectively. Details are shown in Table 1 below.

| videos | events | violations | detected violations | false alerts |
|---|---|---|---|---|
| test | 112 | 34 | 33 | 4 |
| real out | 1732 | 15 | 12 | 5 |

Table 1. Recall and precision of violation detection on 6 test videos and one week's real video.

An advantageous multiple object tracking algorithm and surveillance system and methods based on which an alert reasoning module is used to detect anomalies have been described. The tracking system is preferably built on a graphical representation to facilitate multiple hypotheses maintenance. Therefore, the tracking system is very robust to local object detection results. The pruning strategy based on image information makes the system computation efficient.

The alert reasoning module takes advantage of the tracking results. Predefined rules may be used to detect violations such as piggy-backing and tailgating at access points. Human reviewers and/or machine learning technologies may be used to achieve manual and/or autonomous anomaly detection.

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow and their structural and functional equivalents. As but one of many variations, it should be understood that systems having multiple "stereo" cameras or moving cameras may benefit from including features of the detection and tracking algorithm of the present invention.

In addition, in methods that may be performed according to the claims below and/or preferred embodiments herein, the operations have been described in selected typographical sequences. However, the sequences have been selected and so ordered for typographical convenience and are not intended to imply any particular order for performing the operations, unless a particular ordering is expressly provided or understood by those skilled in the art as being necessary.

Co-Pending Patent Applications

The following list of United States patent applications, which includes the application that matured into this patent, were all filed on the same day and share a common disclosure:

I. "Video surveillance system with rule-based reasoning and multiple-hypothesis scoring," Ser. No. 10/917,985;

II. "Video surveillance system that detects predefined behaviors based on movement through zone patterns," Ser. No. 10/916,870;

III. "Video surveillance system in which trajectory hypothesis spawning allows for trajectory splitting and/or merging," Ser. No. 10/917,201;

IV. "Video surveillance system with trajectory hypothesis spawning and local pruning," Ser. No. 10/917,009;

V. "Video surveillance system with trajectory hypothesis scoring based on at least one non-spatial parameter," Ser. No. 10/916,966;

VI. "Video surveillance system with connection probability computation that is a function of object size," Ser. No. 10/917,063; and VII. "Video surveillance system with object detection and probability scoring based on object class," Ser. No. 10/917,225;

The invention claimed is:

1. A method for use in a video surveillance system, the method comprising generating a first hypothesis comprising a set of hypothesized trajectories of respective objects hypothesized to have been moving through an area under surveillance at a previous time, generating a second hypothesis comprising a different set of hypothesized trajectories of respective ones of said objects hypothesized to have been moving through the area under surveillance at said previous time, generating a first extended hypothesis comprising a set of hypothesized trajectories of respective objects hypothesized to have been moving through the area under surveillance at a present time, the trajectories of said first extended hypothesis comprising 1) at least ones of the trajectories of the first hypothesis, 2) one or more of the objects hypothesized to have been moving through the area under surveillance at said present time, and 3) a particular set of connections extending at least ones of the trajectories of said first hypothesis to at least ones of the objects hypothesized to have been moving through the area under surveillance at said present time, generating a second extended hypothesis comprising a set of hypothesized trajectories of respective ones of said objects hypothesized to have been moving through the area under surveillance at said present time, the trajectories of said second extended hypothesis comprising 1) at least ones of the trajectories of the first hypothesis, 2) one or more of said objects hypothesized to have been moving through the area under surveillance at said present time, and 3) a particular set of connections extending at least ones of the trajectories of said first hypothesis to at least ones of the objects hypothesized to have been moving through the area under surveillance at said present time, the first and second extended hypotheses being different from one another, generating a third extended hypothesis comprising a set of hypothesized trajectories of respective ones of said objects hypothesized to have been moving through the area under surveillance at said present time, the trajectories of said third extended hypothesis comprising 1) at least ones of the trajectories of the second hypothesis, 2) one or more of the objects hypothesized to have been moving through the area under surveillance at said present time, and 3) a particular set of connections extending at least ones of the trajectories of said second hypothesis to at least ones of the objects hypothesized to have been moving through the area under surveillance at said present time, generating a fourth extended hypothesis comprising a set of hypothesized trajectories of respective ones of said objects hypothesized to have been moving through the area under surveillance at said present time, the trajectories of said fourth extended hypothesis comprising 1) at least ones of the trajectories of the second hypothesis, 2) one or more of the objects hypothesized to have been moving through the area under surveillance at said present time, and 3) a particular set of connections extending at least ones of the trajectories of said second hypothesis to at least ones of the objects hypothesized to have been moving through the area under surveillance at said present time, the third and fourth extended hypotheses being different from one another, identifying at least one of said first, second, third and fourth extended hypotheses as being more likely than others of said first, second, third and fourth extended hypotheses to represent the actual trajectories of the actual objects moving through the area under surveillance at said present time, and utilizing said at least said one of said first, second, third and fourth extended hypotheses to determine whether at least one predefined alert condition has occurred within the area under surveillance.

2. The method of claim 1 wherein said identifying includes computing a likelihood for each of said first, second, third and fourth extended hypotheses, the likelihoods for said first, second, third and fourth extended hypotheses each being a function of connection probabilities each associated with a respective trajectory of that particular hypothesis, each connection probability being a measure of the probability that an object that terminates said associated trajectory is, in fact, an object in the area under surveillance that is on that trajectory.

3. The method of claim 2 wherein said at least one of said first, second, third and fourth extended hypotheses is the one having the largest computed likelihood.

4. The method of claim 1 wherein said objects are people and wherein said alert condition includes a predetermined pattern of movement of one or more people relative to at least one of a) at least one other person, b) one or more fixed objects, or c) one or more predefined zones within said area under surveillance.

5. The method of claim 4 wherein said predetermined pattern of movement includes at least one time criterion.

6. An electronic surveillance system adapted to carry out the method defined by claim 1.

7. A computer readable medium on which are stored instructions that are executable by a processor to carry out the method defined by claim 1.

* * * * *